United States Patent
Kuen et al.

(10) Patent No.: US 11,610,393 B2
(45) Date of Patent: Mar. 21, 2023

(54) KNOWLEDGE DISTILLATION FOR NEURAL NETWORKS USING MULTIPLE AUGMENTATION STRATEGIES

(71) Applicant: Adobe Inc., San Jose, CA (US)

(72) Inventors: Jason Wen Yong Kuen, Santa Clara, CA (US); Zhe Lin, Fremont, CA (US); Jiuxiang Gu, College Park, MD (US)

(73) Assignee: Adobe Inc., San Jose, CA (US)

( * ) Notice: Subject to any disclaimer, the term of this patent is extended or adjusted under 35 U.S.C. 154(b) by 286 days.

(21) Appl. No.: 17/062,157

(22) Filed: Oct. 2, 2020

(65) Prior Publication Data
US 2022/0108131 A1 Apr. 7, 2022

(51) Int. Cl.
| | |
|---|---|
| *G06V 10/778* | (2022.01) |
| *G06K 9/62* | (2022.01) |
| *G06N 3/04* | (2006.01) |
| *G06T 3/60* | (2006.01) |
| *G06T 3/40* | (2006.01) |
| *G06V 10/774* | (2022.01) |

(52) U.S. Cl.
CPC ....... *G06V 10/7792* (2022.01); *G06K 9/6257* (2013.01); *G06K 9/6264* (2013.01); *G06N 3/0454* (2013.01); *G06T 3/40* (2013.01); *G06T 3/60* (2013.01); *G06V 10/7747* (2022.01)

(58) Field of Classification Search
CPC .......... G06V 10/7792; G06V 10/7747; G06K 9/6257; G06K 9/6264; G06N 3/0454; G06T 3/40; G06T 3/60
See application file for complete search history.

(56) References Cited

U.S. PATENT DOCUMENTS

| | | | |
|---|---|---|---|
| 2019/0213443 A1* | 7/2019 | Cunningham | G06K 9/6256 |
| 2019/0213451 A1* | 7/2019 | Schäfer | G06V 20/58 |

OTHER PUBLICATIONS

Fu et al, "Role-Wise Data Augmentation for Knowledge Distillation" (published on arXiv at [2004.08861] Role-Wise Data Augmentation for Knowledge Distillation (arxiv.org), Apr. 2020) (Year: 2020).*

(Continued)

*Primary Examiner* — Casey L Kretzer
(74) *Attorney, Agent, or Firm* — Keller Preece PLLC

(57) ABSTRACT

The present disclosure relates to systems, methods, and non-transitory computer readable media for accurately and efficiently learning parameters of a distilled neural network from parameters of a source neural network utilizing multiple augmentation strategies. For example, the disclosed systems can generate lightly augmented digital images and heavily augmented digital images. The disclosed systems can further learn parameters for a source neural network from the lightly augmented digital images. Moreover, the disclosed systems can learn parameters for a distilled neural network from the parameters learned for the source neural network. For example, the disclosed systems can compare classifications of heavily augmented digital images generated by the source neural network and the distilled neural network to transfer learned parameters from the source neural network to the distilled neural network via a knowledge distillation loss function.

20 Claims, 15 Drawing Sheets

(56) References Cited

OTHER PUBLICATIONS

Hessam Bagherinezhad, Maxwell Horton, Mohammad Rastegari, and Ali Farhadi. Label refinery: Improving imagenet classification through label progression. arXiv preprint arXiv:1805.02641, 2018.
Jang Hyun Cho and Bharath Hariharan. On the efficacy of knowledge distillation. In ICCV, pp. 4794-4802, 2019.
Jia Deng, Wei Dong, Richard Socher, Li-Jia Li, Kai Li, and Li Fei-Fei. Imagenet: A large-scale hierarchical image database. In CVPR, pp. 248-255. Ieee, 2009.
Spyros Gidaris, Praveer Singh, and Nikos Komodakis. Unsupervised representation learning by predicting image rotations. In ICLR, 2018.
Gregory Griffin, Alex Holub, and Pietro Perona. Caltech-256 object category dataset. 2007.
K He, X Zhang, S Ren, and J Sun. Deep residual learning for image recognition. In CVPR, pp. 770-778, 2016.
Kaiming He, Xiangyu Zhang, Shaoqing Ren, and Jian Sun. Identity mappings in deep residual networks. In ECCV, pp. 630-645. Springer, 2016.
Byeongho Heo, Jeesoo Kim, Sangdoo Yun, Hyojin Park, Nojun Kwak, and Jin Young Choi. A comprehensive overhaul of feature distillation. In ICCV, pp. 1921-1930, 2019.
Geoffrey Hinton, Oriol Vinyals, and Jeff Dean. Distilling the knowledge in a neural network. arXiv preprint arXiv:1503.02531, 2015.
Gao Huang, Zhuang Liu, Laurens Van Der Maaten, and Kilian Q Weinberger. Densely connected convolutional networks. In CVPR, pp. 4700-4708, 2017.
Ahmet Iscen, Giorgos Tolias, Yannis Avrithis, and Ondrej Chum. Label propagation for deep semi-supervised learning. In CVPR, pp. 5070-5079, 2019.
Alex Krizhevsky et al. Learning multiple layers of features from tiny images. 2009.
Mandar Kulkarni, Kalpesh Patil, and Shirish Karande. Knowledge distillation using unlabeled mismatched images. arXiv preprint arXiv:1703.07131, 2017.
Ilya Loshchilov and Frank Hutter. Sgdr: Stochastic gradient descent with warm restarts. In ICLR, 2017.
Gaurav Menghani and Sujith Ravi. Learning from a teacher using unlabeled data. arXiv preprint arXiv:1911.05275, 2019.
Seyed-lman Mirzadeh, Mehrdad Farajtabar, Ang Li, and Hassan Ghasemzadeh. Improved knowledge distillation via teacher assistant: Bridging the gap between student and teacher. arXiv preprint arXiv:1902.03393, 2019.
Wonpyo Park, Dongju Kim, Yan Lu, and Minsu Cho. Relational knowledge distillation. In CVPR, pp. 3967-3976, 2019.
Hieu Pham, Qizhe Xie, Zihang Dai, and Quoc V Le. Meta pseudo labels. arXivpreprint arXiv:2003.10580, 2020.
Ilija Radosavovic, Piotr Dollár, Ross Girshick, Georgia Gkioxari, and Kaiming He. Data distillation: Towards omni-supervised learning. In CVPR, pp. 4119-4128, 2018.
Sachin Ravi and Hugo Larochelle. Optimization as a model for few-shot learning. In ICLR, 2017.
Adriana Romero, Nicolas Ballas, Samira Ebrahimi Kahou, Antoine Chassang, Carlo Gatta, and Yoshua Bengio. Fitnets: Hints for thin deep nets.arXiv preprint arXiv:1412.6550, 2014.
Jianping Shi, Li Xu, and Jiaya Jia. Discriminative blur detection features. In CVPR, pp. 2965-2972, 2014.
Jianping Shi, Qiong Yan, Li Xu, and Jiaya Jia. Hierarchical image saliency detection on extended cssd.TPAMI, 38(4):717-729, 2015.
Christian Szegedy, Wei Liu, Yangqing Jia, Pierre Sermanet, Scott Reed, Dragomir Anguelov, Dumitru Erhan, Vincent Vanhoucke, and Andrew Rabinovich. Going deeper with convolutions. InCVPR, pp. 1-9, 2015.
Yonglong Tian, Dilip Krishnan, and Phillip Isola. Contrastive representation distillation. In ICLR, 2020.
Frederick Tung and Greg Mori. Similarity-preserving knowledge distillation. In ICCV, pp. 1365-1374, 2019.
Oriol Vinyals, Charles Blundell, Timothy Lillicrap, Daan Wierstra, et al. Matching networks for one shot learning. InNIPS, pp. 3630-3638, 2016.
Qizhe Xie, Eduard Hovy, Minh-Thang Luong, and Quoc V Le. Self-training with noisy student improves imagenet classification. arXiv preprint arXiv:1911.04252, 2019.
Junho Yim, Donggyu Joo, Jihoon Bae, and Junmo Kim. A gift from knowledge distillation: Fast optimization, network minimization and transfer learning. In CVPR, pp. 4133-4141, 201.
Hongwei Yong, Jianqiang Huang, Xiansheng Hua, and Lei Zhang. Gradient centralization: A new optimization technique for deep neural networks. arXiv preprint arXiv:2004.01461, 2020.
Sergey Zagoruyko and Nikos Komodakis. Paying more attention to attention: Improving the performance of convolutional neural networks via attention transfer.arXiv preprint arXiv:1612.03928, 2016.
Sergey Zagoruyko and Nikos Komodakis. Wide residual networks. In BMVC, 2016.
Xiaohua Zhai, Avital Oliver, Alexander Kolesnikov, and Lucas Beyer. S4I: Self-supervised semi-supervised learning. In ICCV, 2019.
Chiyuan Zhang, Samy Bengio, Moritz Hardt, Benjamin Recht, and Oriol Vinyals. Understanding deep learning requires rethinking generalization. In ICLR, 2018.

* cited by examiner

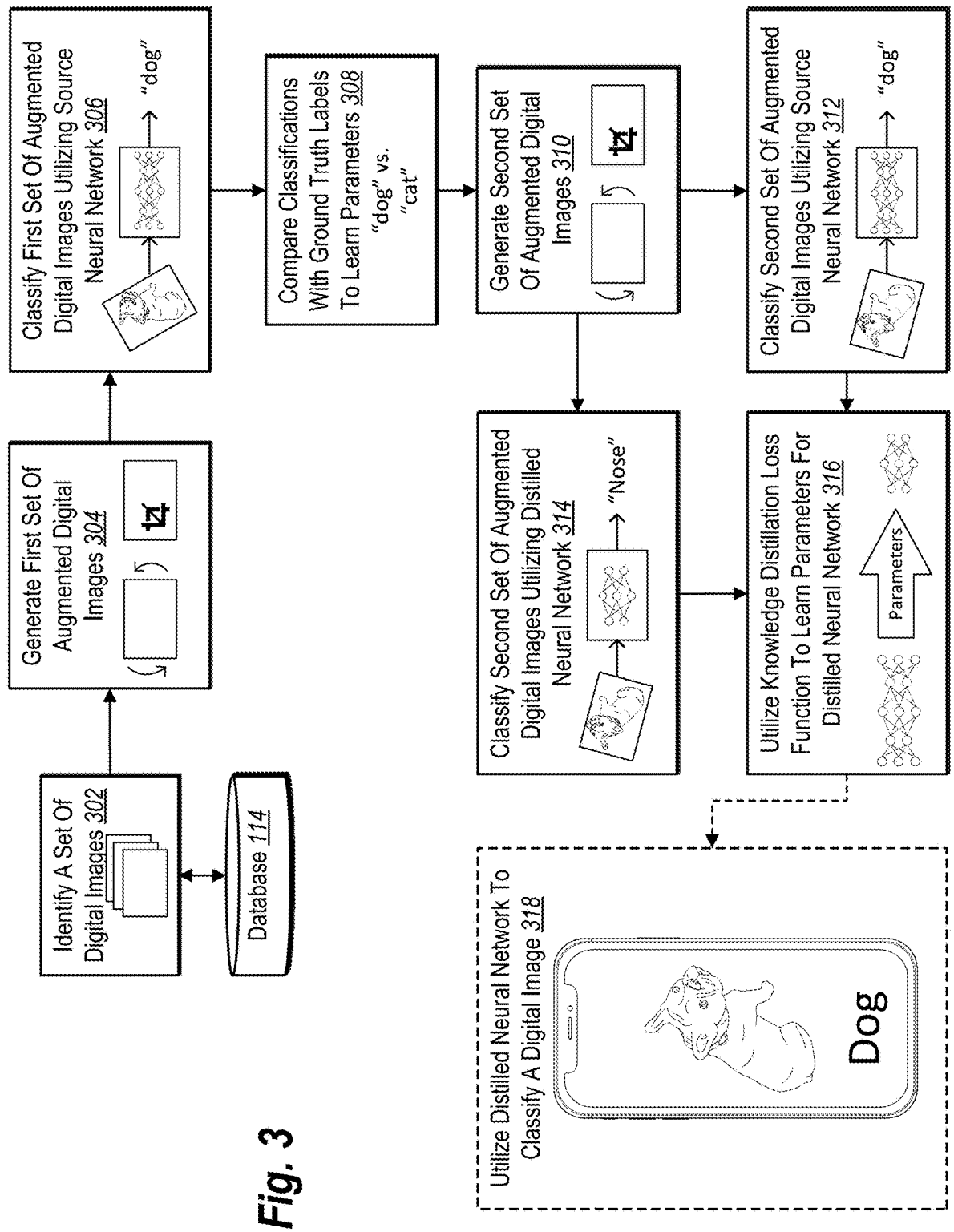

| Model | KD type | Source Network's Cropping | Distilled Network's Cropping | Accuracy (%) |
|---|---|---|---|---|
| Standalone training | | | | |
| ResNet-34 | N/A | light | N/A | 67.46 |
| ResNet-34 | N/A | heavy | N/A | 68.59 |
| ResNet-18 (baseline) | N/A | N/A | light | 66.52 |
| ResNet-18 (baseline) | N/A | N/A | heavy | 66.69 |
| KD training Source: ResNet-34 | | | | |
| Distilled: ResNet-18 | explicit | light | light | 67.68 |
| Distilled: ResNet-18 | explicit | heavy | light | 70.17 |
| Distilled: ResNet-18 | explicit | heavy | heavy | 70.67 |
| Distilled: ResNet-18 | explicit-implicit | light | heavy | 71.99 |

*Fig. 7*

| Standalone training | |
|---|---|
| Model | Accuracy (%) |
| ResNet-34 | 67.46 |
| ResNet-18 (baseline) | 66.52 |

| KD training Source: ResNet-34 | | | | |
|---|---|---|---|---|
| Model | KD type | Distillation w/ normal (non-rotated) images | Distillation w/ excessively-rotated images | Accuracy (%) |
| Distilled: ResNet-18 | explicit | ✓ | ✗ | 67.89 |
| Distilled: ResNet-18 | implicit | ✗ | ✓ | 67.79 |
| Distilled: ResNet-18 | explicit-implicit | ✓ | ✓ | 69.45 |

*Fig. 8A*

| Source Neural Network | Source Network's Accuracy (%) | Distilled Neural Network | Distilled Network's Accuracy (%) | | | |
|---|---|---|---|---|---|---|
| | | | Baseline (no KD) | Explicit (Traditional) KD | Implicit KD | Explicit-Implicit KD |
| WideResNet 16-8 (10.99M params) | 80.26 | WideResNet 16-2 (0.69M params) | 73.08 | 74.85 | 75.09 | 75.94 |
| WideResNet 34-5 (11.57M params) | 80.42 | WideResNet 16-5 (4.30M params) | 78.34 | 79.98 | 80.14 | 80.74 |
| DenseNetBC 40-60 (4.29M params) | 81.01 | DenseNetBC 40-25 (0.76M params) | 76.32 | 78.55 | 79.45 | 80.13 |

*Fig. 8B*

KNOWLEDGE DISTILLATION FOR NEURAL NETWORKS USING MULTIPLE AUGMENTATION STRATEGIES

BACKGROUND

In the field of digital image editing, conventional analysis systems utilize a variety of deep neural networks to implement various visual understanding tasks. For example, some conventional digital image analysis systems can implement explicit knowledge distillation techniques to train or tune smaller neural networks by distilling knowledge from considerably larger, higher-performing neural networks (e.g., so smaller neural networks can mimic predictions of larger neural networks). For example, some conventional digital image analysis systems utilize knowledge distillation techniques focused on particular network architectures, feature activations, and/or loss functions. Other conventional systems utilize knowledge distillation techniques focused on leveraging unlabeled data as part of the training process. Despite these advances, however, many conventional digital image analysis systems suffer from a number of drawbacks and disadvantages, particularly in their accuracy in classifying digital images (or generating other outputs) and their efficiency in training neural networks.

SUMMARY

One or more embodiments described herein provide benefits and solve one or more of the foregoing or other problems in the art with systems, methods, and non-transitory computer readable media that accurately and efficiently distill knowledge from a source neural network to learn parameters for a distilled neural network utilizing different augmentation strategies for digital images (or other training data) associated with the source neural network and the distilled neural network. For example, the disclosed systems can augment a set of digital images utilizing a first augmentation strategy to lightly modify (e.g., slightly rotate or slightly crop) a repository of training digital images. The disclosed systems can also tune or train a source neural network to learn parameters from the set of lightly augmented digital images. In addition, the disclosed systems can augment a repository of digital images utilizing a second augmentation strategy to heavily modify (e.g., heavily rotate or heavily crop) the digital images. The disclosed systems can further learn parameters for the distilled neural network from learned parameters of the source neural network by comparing different classifications of the heavily augmented digital images generated by each of the source and distilled neural networks. By utilizing different augmentation strategies for the source neural network and the distilled neural network, the disclosed systems can significantly improve performance of the distilled neural network as compared to conventional systems.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which:

FIG. 3 illustrates example sequence of acts for learning parameters of a distilled neural network based on a source neural network utilizing multiple augmentation strategies in accordance with one or more embodiments;

FIG. 7 illustrates a table of performance results associated with the knowledge distillation system in accordance with one or more embodiments;

FIGS. 8A-8B illustrate performance results associated with conventional digital image analysis systems and the knowledge distillation system in accordance with one or more embodiments;

DETAILED DESCRIPTION

Figure 1:
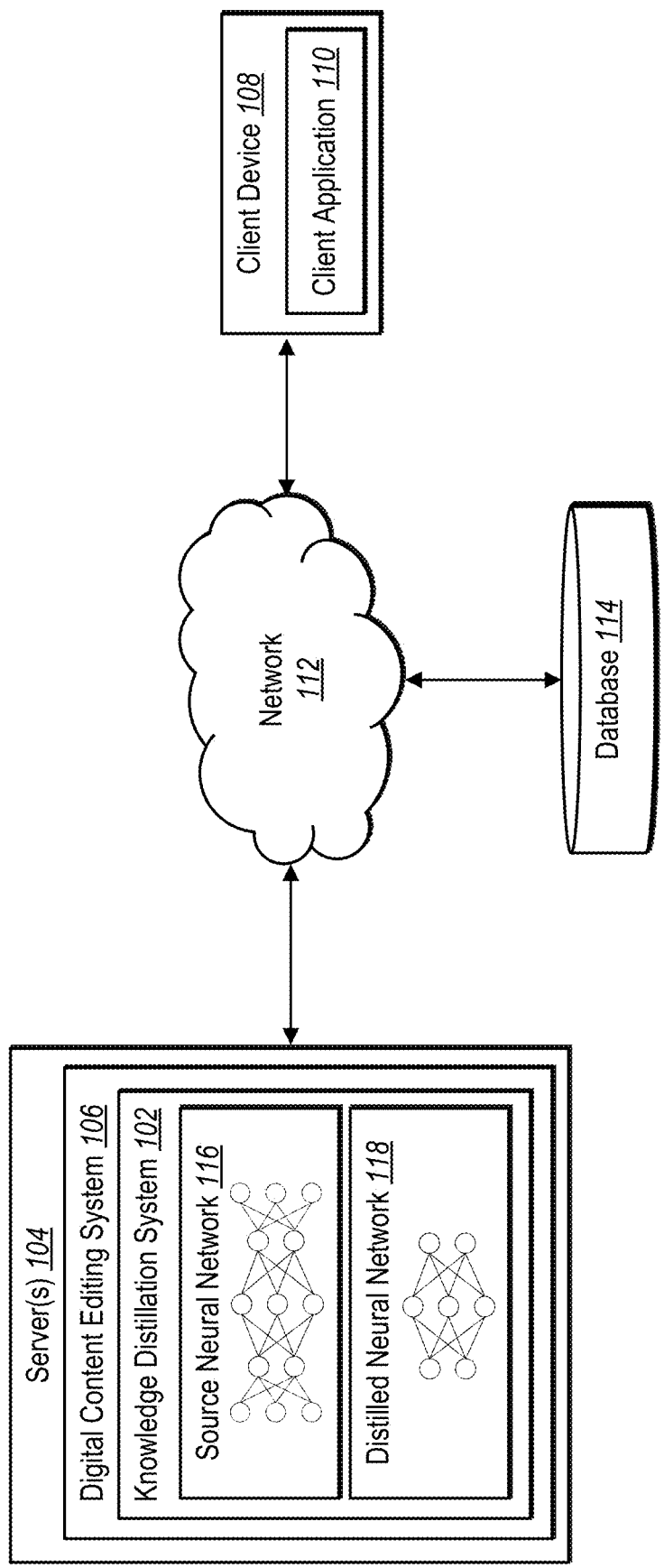
FIG. 1 illustrates an example system environment in which a knowledge distillation system operates in accordance with one or more embodiments.

One or more embodiments described herein include a knowledge distillation system that accurately and efficiently learns parameters for a distilled neural network from parameters of a source neural network utilizing multiple augmentation strategies. Particularly, in embodiments described herein, the knowledge distillation system implements a first augmentation strategy to lightly augment digital images (e.g., with minor rotations or minor cropping). In these or other embodiments, the knowledge distillation system also utilizes a second augmentation strategy to heavily augment the same digital images with heavy, more drastic modifications. From the lightly augmented digital images, in certain embodiments, the knowledge distillation system learns parameters for a source neural network by training or tuning the neural network on the lightly augmented digital images. The knowledge distillation system further transfers parameters from the source neural network to a distilled neural network by comparing classifications of the heavily augmented digital images from the source neural network and the distilled neural network utilizing a knowledge distillation loss function.

As mentioned, in one or more embodiments the knowledge distillation system generates a first set of augmented digital images. For example, the knowledge distillation system augments a set of digital images using a first augmentation strategy for light augmentations of the digital images. More specifically, in some cases, the knowledge distillation system lightly augments the digital images by slightly rotating, slightly cropping, or slightly modifying hues (or other visual parameters) of the digital images. In some embodiments, the knowledge distillation system implements a light augmentation strategy that is defined by a certain (e.g., light) augmentation range. For instance, the knowledge distillation system lightly augments digital images by rotating the digital images within a range of 1 to 45 degrees or by cropping a range of 1 to 25 percent from the digital images.

As further mentioned, in certain embodiments, the knowledge distillation system learns parameters for a source neural network from the first set of augmented digital images. For instance, the knowledge distillation system generates or predicts classifications for the lightly augmented digital images utilizing the source neural network. In addition, the knowledge distillation system compares the classifications with ground truth labels utilizing a classification loss function. In some embodiments, the knowledge distillation system further back propagates to modify parameters of the source neural network to reduce a measure of error or loss associated with the classification loss function. Over multiple iterations, or epochs, the knowledge distillation system repeats the process of generating classifications for lightly augmented digital images, comparing the classifications with ground truth labels, and back propagating to modify neural network parameters to improve the accuracy of the source neural network (e.g., until a threshold measure of loss or a threshold accuracy is satisfied).

In addition to generating a first of augmented digital images, in one or more embodiments, the knowledge distillation system also generates a second set of augmented digital images. For example, the knowledge distillation system augments the same set of digital images using a second augmentation strategy for heavy augmentations. More specifically, in some cases, the knowledge distillation system heavily augments the digital images by heavily rotating, heavily cropping, or heavily modifying hues (or other visual parameters) of the digital images. In some embodiments, the knowledge distillation system implements a heavy augmentation strategy that is defined by a certain (e.g., heavy) augmentation range. For instance, the knowledge distillation system heavily augments digital images by rotating the digital images within a range of 40 to 90 degrees or by cropping a range of 20 to 50 percent from the digital images.

As another example, the knowledge distillation system generates a second set of augmented digital images utilizing an excessively heavily augmentation strategy. For example, the knowledge distillation system utilizes an excessively heavy augmentation strategy with an augmentation range that is mutually exclusive from a light augmentation range. For example, if the knowledge distillation system implements a light augmentation strategy by rotating a repository of digital images within a range of 10-50 degrees, the knowledge distillation system can implement a heavy augmentation strategy by rotating the repository of digital images within a range of 90 to 180 degrees. Thus, compared to a heavy augmentation range which may have some overlap with a light augmentation range, in certain embodiments, the knowledge distillation system utilizes an excessively heavy augmentation range which has no overlap with the light augmentation range.

Based on the light augmentation and the heavy augmentation of the set of digital images, in one or more embodiments, the knowledge distillation system further learns parameters for a distilled neural network. For instance, the knowledge distillation system transfers or distills parameters learned from a source neural network to a distilled neural network. To elaborate, in certain cases, the knowledge distillation system transfers, to a distilled neural network, parameters of a source neural network learned from classifying a lightly augmented set of digital images.

To transfer parameters from a source neural network to a distilled neural network, in some embodiments, the knowledge distillation system compares classifications for the set of heavily augmented digital images generated by the source neural network and the distilled neural network. For example, the knowledge distillation system compares classifications for the set of heavily augmented digital images (as generated by the source neural network and the distilled neural network). Indeed, in some cases, the knowledge distillation system utilizes a source neural network with parameters learned from the set of lightly augmented digital images to generate classifications for the heavily augmented digital images. In these or other cases, the knowledge distillation system utilizes the distilled neural network to generate classifications for the heavily augmented digital images as well.

In one or more embodiments, the knowledge distillation system further compares the respective classifications of the source neural network and distilled neural network via a knowledge distillation loss function. In these or other embodiments, the knowledge distillation system back propagates to modify parameters of the distilled neural network to improve classification accuracy by reducing a measure of loss determined via the knowledge distillation loss function (and/or a classification loss function). By thus utilizing the knowledge distillation loss function and modifying parameters over multiple training iterations, the knowledge distillation system improves the prediction accuracy of the distilled neural network to more closely mimic predictions of the source neural network (e.g., by modifying the parameters of the distilled neural network to more closely resemble those of the source neural network).

As suggested above, conventional digital image analysis systems suffer from a number of drawbacks or disadvantages. In particular, conventional systems often experience inferior performance (e.g., inaccurate classification of digital images). Researchers here have discovered that some of these inferior performance results stem from conventional systems relying exclusively on knowledge distillation techniques that utilize the same augmentation strategies for both source neural networks and distilled neural networks. Indeed, by relying solely on the same augmentation strategy, conventional systems generate distilled neural networks that less accurately classify digital images. Historically, some systems have attempted to heavily augment digital images in training a source neural network. However, heavily augmented digital images can significantly modify a digital image to the point that the modified digital image no longer aligns with ground truth training labels (e.g., a heavy cropping actually removes the labeled subject of a digital image). Accordingly, conventional systems generally avoid heavily augmented digital images in network training.

In addition, conventional digital image analysis systems inefficiently utilize computing resources. More specifically, due at least in part to the inaccuracy of some conventional systems in relying exclusively on explicit knowledge distillation, these conventional systems require large-capacity neural networks to fit or analyze noisy data. Because distilled neural networks trained by these conventional systems are often lower-capacity, conventional systems cannot accurately generate predictions for noisy data utilizing lower-capacity networks. Requiring large neural networks for tasks such as digital image classification in this way consumes large amounts of computer resources that could otherwise be avoided. As another example of inefficiency, some conventional systems utilize knowledge distillation techniques focused on leveraging unlabeled data as part of the training process. These conventional systems utilize excessive computing resources such as processing time, processing power, and memory due to the computational cost of curating unlabeled data in training neural networks as part of knowledge distillation.

Addressing the above drawbacks, in one or more embodiments the knowledge distillation system provides several advantages over conventional digital image analysis systems. For example, the knowledge distillation system can improve neural network performance (e.g., digital image classification accuracy) over conventional systems. As opposed to conventional systems that rely solely on explicit knowledge distillation and a single image augmentation strategy, the knowledge distillation system can utilize a combination of explicit-implicit knowledge distillation technique which results in more accurate classifications for digital images (or performing other neural network tasks more accurately). More specifically, the knowledge distillation system can utilize multiple augmentation strategies to augment digital images to use as a basis for transferring parameters from a source neural network to a distilled neural network.

As another example of improved accuracy, in some embodiments the knowledge distillation system increases the classification accuracy of a distilled neural network by encouraging predictive consistency between the distilled neural network and a source neural network on out-of-distribution unlabeled data. For instance, in one or more embodiments, the knowledge distillation system learns parameters for a distilled neural network to predict classifications consistently with a source neural network based on heavily augmented or excessively heavy augmented data, which is out-of-distribution for both networks. As reflected in the figures discussed below, researchers have shown that the resultant distilled neural network more accurately classifies digital images than distilled neural networks trained by conventional systems. These improvements are especially salient in cases where example implementations of the knowledge distillation system utilizes light augmentation (e.g., slighter rotations or slighter cropping) for training a source neural network and a combination of light augmentation and heavy augmentation (e.g., more drastic rotations or more drastic cropping) for transferring learned parameters to a distilled neural network.

In addition to its improved accuracy, the knowledge distillation system can further improve efficiency over conventional digital image analysis systems. While some conventional systems improve knowledge distillation to an extent by constructing training data focused on leveraging unlabeled datasets, these conventional systems increase the computational cost of curating training data for learning parameters of neural networks. By contrast, in one or more embodiments the knowledge distillation system improves training data configuration through different augmentation strategies through a common repository of labeled digital images, thus avoiding unlabeled data and the corresponding computational cost that comes with unlabeled data curation cost. Accordingly, the knowledge distillation system can utilize fewer computing resources such as processing time, processing power, and memory in training or tuning a distilled neural network from learned parameters of a source neural network, as compared to conventional systems.

Additional detail regarding the knowledge distillation system will now be provided with reference to the figures. For example, FIG. 1 illustrates a schematic diagram of an example system environment for implementing a knowledge distillation system 102 in accordance with one or more embodiments. An overview of the knowledge distillation system 102 is described in relation to FIG. 1. Thereafter, a more detailed description of the components and processes of the knowledge distillation system 102 is provided in relation to the subsequent figures.

As shown, the environment includes server(s) 104, a client device 108, a database 114, and a network 112. Each of the components of the system environment communicate via the network 112, and the network 112 may be any suitable network over which computing devices communicate. Example networks are discussed in more detail below in relation to FIG. 12.

As mentioned, the environment includes a client device 108. The client device 108 is one of a variety of computing devices, including a smartphone, a tablet, a smart television, a desktop computer, a laptop computer, a virtual reality device, an augmented reality device, or another computing device as described in relation to FIG. 12. Although FIG. 1 illustrates a single client device 108, in some embodiments the environment includes multiple different client devices, each associated with a different user (e.g., a digital image designer). The client device 108 communicates with the server(s) 104 via the network 112. For example, the client device 108 receives user input from a user interacting with the client device 108 (e.g., via the client application 110) to, for instance, access a digital image depicting a particular object such as a dog, a cat, a tree, a house, a car, or a person (e.g., as part of a digital image query) and/or to classify a particular digital image to determine what object or objects are depicted within the digital image. The knowledge distillation system 102 on the server(s) 104 receives information or instructions to classify the digital image and/or to search for and identify digital images that depict the indicated object (e.g., from a repository of digital images within the database 114) based on the input received by the client device 108.

As shown, the client device 108 includes a client application 110. In particular, the client application 110 is a web application, a native application installed on the client device 108 (e.g., a mobile application, a desktop application, etc.), or a cloud-based application where all or part of the functionality is performed by the server(s) 104. The client application 110 presents or displays information to a user, including a digital image classification interface for classifying digital images and/or a digital image search interface for providing queries and displaying resultant digital images and depicted requested objects (as classified by the knowledge distillation system 102). A user interacts with the client application 110 to provide user input to perform operations as mentioned above, such as indicating a request to classify a digital image and/or providing a query to search for a digital image depicting a particular object.

As illustrated in FIG. 1, the environment includes the server(s) 104. The server(s) 104 generates, track, store, process, receive, and transmit electronic data, such as digital images (including a repository of digital images for generating lightly augmented digital images and heavily augmented digital images), a source neural network, and a distilled neural network. For example, the server(s) 104 receives data from the client device 108 in the form of a request to classify digital images or a request to search for digital images depicting a particular object. In addition, the server(s) 104 transmits data to the client device 108 to provide a digital image search interface including one or more digital images identified to depict the requested object. Indeed, the server(s) 104 communicates with the client device 108 to transmit and/or receive data via the network 112. In some embodiments, the server(s) 104 comprises a distributed server where the server(s) 104 includes a number of server devices distributed across the network 112 and located in different physical locations. The server(s) 104 comprises a content server, an application server, a communication server, a web-hosting server, or a machine learning server.

As shown in FIG. 1, the server(s) 104 also includes the knowledge distillation system 102 as part of a digital content editing system 106. The digital content editing system 106 communicates with the client device 108 to perform various functions associated with the client application 110 such as learning parameters for a source neural network 116, learning parameters for a distilled neural network 118, and (in some cases) utilizing the distilled neural network 118 to classify digital images. For example, the knowledge distillation system 102 communicates with the database 114 to access a repository of digital images from which to train or tune the source neural network 116 and the distilled neural network 118. Indeed, as further shown in FIG. 1, the environment includes a database 114. In particular, the database 114 stores information such as digital images, including a set of lightly augmented digital images and a set of heavily augmented digital images (as generated by the knowledge distillation system 102). In some embodiments, the database 114 also stores one or more components of the source neural network 116 and/or the distilled neural network 118 such as neural network parameters or weights that define how the various neurons and layers of the respective neural networks analyze and pass data to generate outputs, as well as various loss functions such as a knowledge distillation loss function and a classification loss function.

Although FIG. 1 illustrates a particular arrangement of the environment, in some embodiments, the environment has a different arrangement of components and/or may have a different number or set of components altogether. For instance, in some embodiments, the knowledge distillation system 102 is implemented by (e.g., located entirely or in part) on the client device 108 and/or a third-party device. In addition, in one or more embodiments, the client device 108 communicates directly with the knowledge distillation system 102, bypassing the network 112. Further, in some embodiments, the database 114 is located external to the server(s) 104 (e.g., in communication via the network 112) or located on the server(s) 104 and/or on the client device 108.

As mentioned, in some embodiments the knowledge distillation system 102 distills or transfers learned parameters (e.g., "knowledge") of a source neural network to a distilled neural network utilizing multiple augmentation strategies. In certain embodiments, a neural network refers to a machine learning model that can be trained and/or tuned based on inputs to determine classifications or approximate unknown functions. For example, the term neural network includes a model of interconnected artificial neurons (e.g., organized in layers) that communicate and learn to approximate complex functions and generate outputs (e.g., determinations of digital image classes) based on a plurality of inputs provided to the neural network and in accordance with internal parameters or weights that define how the neural network analyzes data. In some cases, a neural network refers to an algorithm (or set of algorithms) that implements deep learning techniques to model high-level abstractions in data. Accordingly, a neural network can refer to a convolutional neural network, a recurrent neural network (such as an LSTM), or a graph neural network.

Relatedly, in some embodiments, a source neural network refers to a neural network (e.g., with more neurons and/or layers than a distilled neural network) that is utilized as a source for distilling knowledge, or transferring learned parameters, to a distilled neural network. Along these lines, a distilled neural network includes to a neural network (e.g., with fewer neurons and/or layers than a source neural network) for which parameters are distilled, or transferred, from a source neural network.

Figure 2:
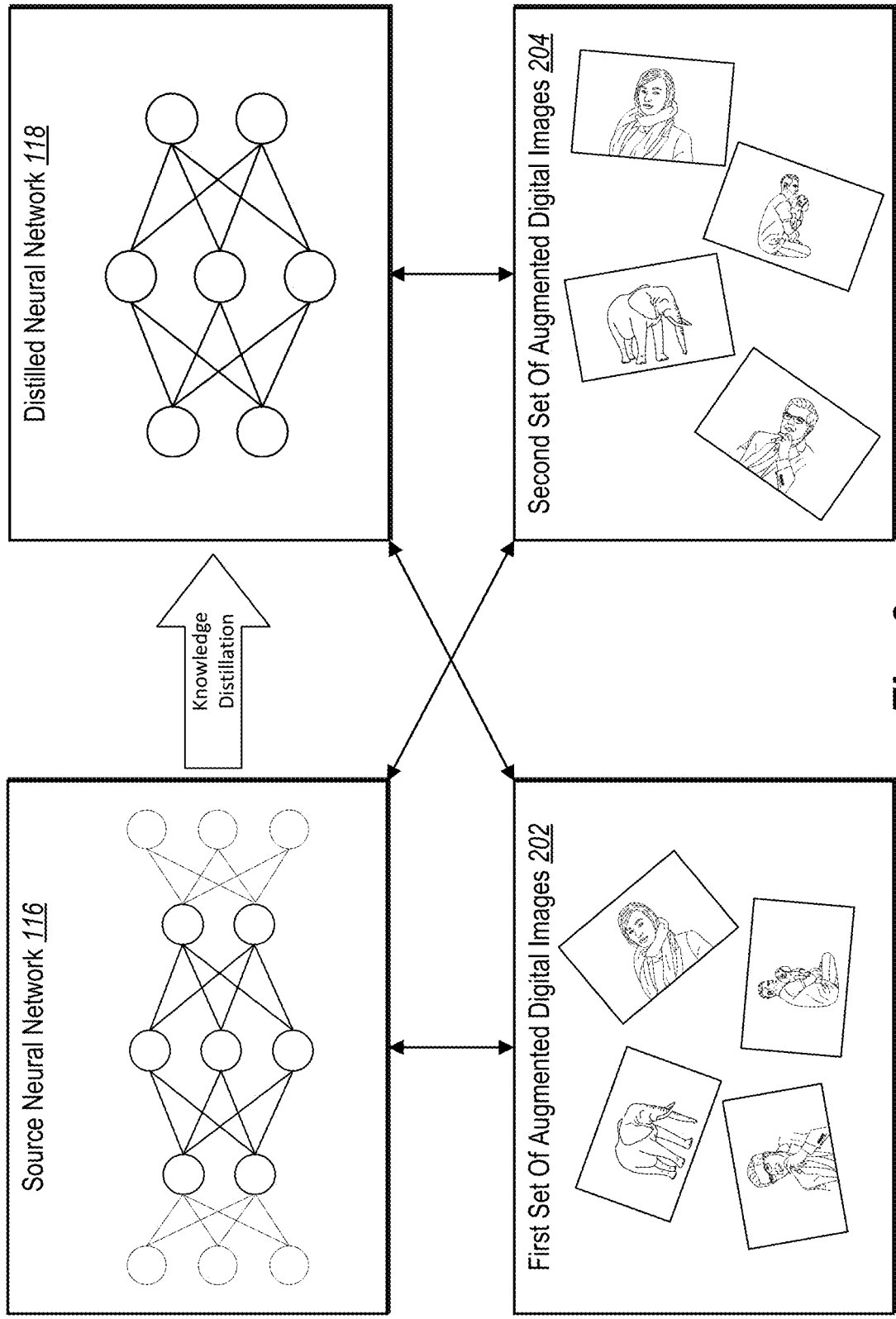
FIG. 2 illustrates an overview of knowledge distillation from a source neural network to a distilled neural network based on multiple augmentation strategies in accordance with one or more embodiments.

In one or more embodiments, the knowledge distillation system utilizes a first set of augmented digital images augmented via a first augmentation strategy and also utilizes a second set of augmented digital images augmented via a second augmentation strategy as part of transferring parameters from a source neural network to a distilled neural network. FIG. 2 illustrates an example representation of distilling learned parameters from a source neural network 116 to a distilled neural network 118 in accordance with one or more embodiments.

As illustrated in FIG. 2, the knowledge distillation system 102 utilizes a first set of augmented digital images 202 to tune or train the source neural network 116. In particular, the knowledge distillation system 102 generates, identifies, or accesses the first set of digital images 202 (e.g., a set of lightly augmented digital images) for training the source neural network 116. As shown in FIG. 2, the first set of digital images 202 are lightly rotated (e.g., within a first augmentation range). In one or more embodiments, an augmented digital image refers to a digital image that has been augmented or modified (e.g., from its original, unmodified state). For example, an augmented digital image can include a rotated digital image, a cropped digital image, a digital image with an artifact added to it, a digital image that has been blurred, a digital image that has been flipped, a digital image that has been resized, a digital image with a modified hue (or other modified color parameters such as saturation or brightness), or a digital image that has been modified in some other way.

Relatedly, a lightly augmented digital image refers to a digital image that has been augmented in accordance with a light augmentation strategy/light augmentation range (e.g., a range of modifications that is less than or lower than a heavy augmentation range). For instance, a lightly augmented digital image refers to a digital image that has been lightly rotated (e.g., within a range of 1 to 45 degrees) or lightly cropped (e.g., within a range of 1 to 25 percent of the image cropped out). Conversely, a heavily augmented digital image refers to digital image that has been augmented in accordance with a heavy augmentation strategy/heavy augmentation range (e.g., a range of modifications that is larger than or greater than a light augmentation range). For instance, in some cases, a heavily augmented digital image refers to a digital image that has been heavily rotated (e.g., within a range of 40 to 90 degrees) or heavily cropped (e.g., within a range of 20 to 50 percent of the image cropped out).

In some embodiments, a heavy augmentation range has some overlap with a light augmentation range. In other embodiments, a heavily augmented digital image refers to an excessively heavily augmented digital image that has been modified in accordance with an excessively heavy augmentation range. For example, an excessively heavy augmentation range can include a range that is mutually exclusive from a light augmentation range (e.g., there is no overlap with a light augmentation range). For example, an excessively heavily augmented digital image refers to an excessively heavily rotated digital image (e.g., within a range of 90 to 180 degrees) or an excessively heavily cropped digital image (e.g., within a range of 50 to 75 percent of the image cropped out).

As suggested, in one or more embodiments, an augmentation range refers to a range, a degree, a span, a distribution, or a measure of modification or augmentation made to a digital image. For example, a light augmentation range refers to a span (or distribution) of modifications for slighter or less drastic changes to a digital image. In some cases, a light augmentation range includes an upper limit (e.g., a maximum value or an upper bound of the range) that is lower than an upper limit of a heavy augmentation range. Conversely, a heavy augmentation range refers to a span (or distribution) of modifications for heavier or more drastic changes to a digital image. For example, a heavy augmentation range includes an upper limit that is higher or greater than an upper limit of a light augmentation range. In some cases, a heavy augmentation range overlaps a light augmentation range, while in other cases, a heavy augmentation range is mutually exclusive from a light augmentation range. Indeed, in one or more embodiments, a heavy augmentation range refers to an excessively heavy augmentation range that is mutually exclusive from a light augmentation range and that indicates excessively heavy augmentations or modifications to digital images. In some cases, heavy augmentations refer to augmentations that improve test-time performance of non-knowledge-distillation standalone, single-model training, while excessively heavy augmentations refer to augmentations that are harmful to test-time performance of non-knowledge-distribution standalone, single-model training.

As illustrated in FIG. 2, the knowledge distillation system 102 inputs a lightly augmented digital image from the first set of augmented digital images 202 into the source neural network 116. From the lightly augmented digital image, the source neural network 116 generates an output in the form of a predicted classification for the image. For instance, the knowledge distillation system 102 inputs the slightly rotated digital image of the elephant, whereupon the source neural network 116 generates a classification label such as "elephant." In some cases, the source neural network 116 may incorrectly predict a classification of an input digital image from the first set of augmented digital images 202 (e.g., by generating a classification label such as "mouse" for the image of the elephant).

In any event, the knowledge distillation system 102 learns parameters for the source neural network 116 by comparing the predicted classification with a ground truth label for the lightly augmented digital image. In some examples, a ground truth label refers to an actual, correct classification for a digital image. For instance, a ground truth label refers to a string of characters that identifies an object depicted within a digital image. The knowledge distillation system 102 compares the predicted classification with a ground truth label utilizing a classification loss function (e.g., a cross entropy loss function, a mean square error loss function, or some other classification loss function). Additionally, the knowledge distillation system 102 back propagates to modify parameters of the source neural network 116 to adjust how the source neural network 116 processes digital images.

The knowledge distillation system 102 repeats the training process by selecting another lightly augmented digital image from the first set of digital images 202, utilizing the source neural network 116 to generate a predicted classification, comparing the predicted classification with a ground truth label, and back propagating to modify parameters of the source neural network 116. Over multiple iterations of this training process to modify parameters, the knowledge distillation system 102 improves the accuracy of the source neural network 116 in predicting classifications and learns the parameters of the source neural network 116 that result in a threshold accuracy (e.g., parameters that result in generated predicted classifications that satisfy a threshold measure of loss) or a highest accuracy.

Based on these parameters of the source neural network 116 learned from the first set of augmented digital images 202, the knowledge distillation system 102 further learns parameters for the distilled neural network 118. In particular, the knowledge distillation system 102 distills or transfers the learned knowledge or the learned parameters from the source neural network 116 to the distilled neural network 118. For example, the knowledge distillation system 102 utilizes the source neural network 116 to generate classifications for digital images of the second set of augmented digital images 204 (e.g., a set of heavily augmented digital images). More particularly, the knowledge distillation system 102 inputs a heavily augmented digital image from the second set of augmented digital images 204 into the source neural network 116, whereupon the source neural network 116 generates a predicted classification for the heavily augmented digital image.

Additionally, the knowledge distillation system 102 inputs the same heavily augmented digital image from the set of augmented digital images 204 into the distilled neural network 118. The distilled neural network 118, in turn, generates a predicted classification for the heavily augmented digital image as well. The knowledge distillation system 102 compares the classification generated by the distilled neural network 118 with the classification generated by the source neural network 116. For instance, the knowledge distillation system 102 utilizes a knowledge distillation loss function to compare the source neural network classification with the distilled neural network classification.

In some embodiments, the knowledge distillation system 102 also compares the classification of the heavily augmented digital image from the distilled neural network 118 with a ground truth label. For instance, the knowledge distillation system 102 utilizes a classification loss function to compare the classification with a ground truth label. In one or more embodiments, the knowledge distillation system 102 also compares a predicted classification generated by the distilled neural network 118 for a lightly augmented digital image (e.g., from the first set of augmented digital images 202) with a ground truth label. In some embodiments, such as embodiments where the second set of augmented digital images 204 includes excessively heavily augmented digital images, the knowledge distillation system 102 does not compare the predicted classification of the excessively heavily augmented digital image from the distilled neural network 118 with a ground truth label.

Based on comparing the classifications from the source neural network 116 and the distilled neural network 118 with each other and/or with ground truth labels, the knowledge distillation system 102 further back propagates to modify parameters of the distilled neural network 118. For example, the knowledge distillation system 102 modifies parameters of the distilled neural network 118 to improve its prediction accuracy by adjusting the parameters to more closely resemble the parameters of the source neural network 116 (thus transferring the learned parameters of the source neural network 116 to the distilled neural network 118).

The knowledge distillation system 102 further repeats the training process for multiple iterations or epochs. Particularly, the knowledge distillation system 102 inputs another heavily modified digital image from the second set of augmented digital images 204 into the source neural network 116 and the distilled neural network 118. In turn, the source neural network 116 and the distilled neural network 118 generate respective predicted classifications for the heavily augmented digital image. The knowledge distillation system 102 further compares the classifications with each other (and/or with ground truth labels) and back propagates to modify parameters of the distilled neural network 118 (e.g., to more closely resemble the learned parameters of the source neural network 116). The knowledge distillation system 102 thus improves the accuracy of the distilled neural network 118 by learning its parameters from the learned parameters of the source neural network 116 (to thereby mimic predictions of the source neural network 116).

As mentioned above, in some embodiments, the knowledge distillation system 102 transfers learned parameters from a source neural network (e.g., the source neural network 116) to a distilled neural network 118). To transfer the learned parameters, the knowledge distillation system 102 also generates sets of augmented digital images to use as part of a training process for the source neural network 116 and the distilled neural network 118. FIG. 3 illustrates an example sequence of acts 302 whereby the knowledge distillation system 102 generates sets of augmented digital images and transfers learned parameters to a distilled neural network in accordance with one or more embodiments. The description of FIG. 3 provides an overview of the acts performed by the knowledge distillation system 102, while additional detail for the specific acts is provided below with reference to subsequent figures.

As illustrated in FIG. 3, the knowledge distillation system 102 performs an act 302 to identify a set of digital images. In particular, the knowledge distillation system 102 accesses the database 114 to identify a set of digital images to use for training neural networks. In some embodiments, the knowledge distillation system 102 accesses a set of digital images from the datasets maintained by the Canadian Institute for Advanced Research ("CIFAR"), such as the CIFAR-10 dataset or the CIFAR-100 dataset.

As further illustrated in FIG. 3, the knowledge distillation system 102 performs an act 304 to generate a first set of augmented digital images. More specifically, the knowledge distillation system 102 augments the set of digital images accessed from the database 114 (e.g., the CIFAR-10 or the CIFAR-100 sets of digital images). The knowledge distillation system 102 augments the set of digital images by performing augmentations such as rotations or crops within a first augmentation range. For example, the knowledge distillation system 102 generates the first set of augmented digital images by lightly augmenting the digital images by different degrees or amounts, in accordance with a light augmentation range. In some embodiments, the knowledge distillation system 102 rotates or crops the digital images based on a light rotation range or a light cropping range.

The knowledge distillation system 102 further performs an act 306 to classify the first set of augmented digital images utilizing a source neural network (e.g., the source neural network 116). Particularly, to classify a lightly augmented digital image from the first set of augmented digital images, the knowledge distillation system 102 processes the digital image utilizing the source neural network 116. For instance, the knowledge distillation system 102 analyzes the slightly rotated image of a dog utilizing the source neural network 116. The source neural network 116 generates a predicted classification for the lightly augmented digital image, such as a predicted label of "dog."

As also shown in FIG. 3, the knowledge distillation system 102 performs an act 308 to compare classifications with ground truth labels to learn parameters. Indeed, the knowledge distillation system 102 compares the predicted classifications generated by the source neural network 116 with corresponding ground truth labels for the set of digital images (e.g., as stored within the database 114). For example, the knowledge distillation system 102 accesses ground truth labels for the set of digital images and utilizes a classification loss function to determine a measure of loss between the predicted classifications and the corresponding ground truth labels.

As described above, the knowledge distillation system 102 further back propagates to modify parameters of the source neural network 116. Specifically, the knowledge distillation system 102 modifies or adjusts parameters or weights of the source neural network 116 to more accurately generate predictions. Over multiple iterations of predicting classifications and adjusting parameters to reduce a measure of loss resulting from a loss function, the knowledge distillation system 102 thus learns parameters for the source neural network 116 that result in accurate classifications of lightly augmented digital images (e.g., that satisfy a threshold measure of loss).

As further illustrated in FIG. 3, the knowledge distillation system 102 performs an act 310 to generate a second set of augmented digital images. In particular, the knowledge distillation system 102 accesses the set of digital images utilized to train the source neural network 116 (or a different set of digital images), such as the CIFAR-10 or the CIFAR-100 digital images. The knowledge distillation system 102 further augments the digital images in accordance with a second, heavy augmentation range.

For example, the knowledge distillation system 102 augments the set of digital images by performing augmentations such as rotations or crops within a second augmentation range. For example, the knowledge distillation system 102 generates the second set of augmented digital images by heavily rotating or cropping the digital images by different degrees or amounts, in accordance with a heavy augmentation range. Indeed, the knowledge distillation system 102 rotates or crops the digital images based on a heavy rotation range or a heavy cropping range.

The knowledge distillation system 102 further performs an act 312 to classify the second set of augmented digital images utilizing the source neural network 116. More specifically, the knowledge distillation system 102 processes heavily augmented digital images from the second set of augmented digital images utilizing the source neural network 116, whereupon the source neural network 116 generates classifications based on its parameters learned from the first set of augmented digital images. As shown, the knowledge distillation system 102 processes a heavily rotated digital image of the same dog utilizing the source neural network 116, whereupon the source neural network 116 generates a classification label of "dog."

Further based on the second set of augmented digital images, the knowledge distillation system 102 performs an act 314 to classify the second set of augmented digital images utilizing the distilled neural network 118. In particular, the knowledge distillation system 102 processes heavily augmented digital images from the second set of augmented digital images utilizing the distilled neural network 118, whereupon the distilled neural network 118 generates predicted classifications. As shown, the knowledge distillation system 102 processes the same heavily rotated digital image of the dog (as described in relation to the act 312) utilizing the distilled neural network 118. In turn, the distilled neural network 118 generates a predicted classification of "Nose."

As further illustrated in FIG. 3, the knowledge distillation system 102 performs an act 316 to utilize a knowledge distillation loss function to learn parameters for the distilled neural network 118. In particular, the knowledge distillation system 102 compares the generated classifications from the source neural network 116 and the distilled neural network 118 to determine an error or a measure of loss between them (e.g., via a knowledge distillation loss function). For instance, the knowledge distillation system 102 compares the classification of "dog" from the source neural network 116 with the classification of "Nose" from the distilled neural network 118. Based on the comparison, the knowledge distillation system 102 modifies parameters of the distilled neural network 118 to more closely match the parameters of the source neural network 116, to effectively encourage the distilled neural network 118 to mimic the predicted classifications of the source neural network 116.

As part of learning parameters for the distilled neural network 118, in some embodiments, the knowledge distillation system 102 also compares classifications generated by the distilled neural network 118 with ground truth labels. To elaborate, the knowledge distillation system 102 compares a classification of a heavily augmented digital image generated by the distilled neural network 118 with a corresponding ground truth label. In some embodiments, such as embodiments where the knowledge distillation system 102 utilizes an excessively heavily augmented set of digital images for knowledge distillation, the knowledge distillation system 102 does not compare classifications of the (excessively) heavily augmented digital images with ground truth labels.

In these or other embodiments, the knowledge distillation system 102 compares classifications of the first set of augmented digital images generated by the distilled neural network 118 with ground truth labels. Indeed, the knowledge distillation system 102 classifies the digital images of the first set of augmented digital images utilizing the distilled neural network 118. In addition, the knowledge distillation system 102 compares the classifications with corresponding ground truth labels utilizing a classification loss function.

In some embodiments, the knowledge distillation system 102 compares classifications and/or ground truth labels in a feature space. To elaborate, the knowledge distillation system 102 determines or generates feature vectors that represent the classification labels from the source neural network 116, the distilled neural network 118, and the corresponding ground truth labels. In addition, the knowledge distillation system 102 determines distances between the feature vectors in the feature space. For instance, the knowledge distillation system 102 determines distances between feature vectors corresponding to predicted classifications of the source neural network 116 and the distilled neural network 118, as well as between feature vectors of predicted classifications and ground truth labels. In some embodiments, the knowledge distillation system 102 utilizes loss functions, such as a knowledge distillation loss function, to determine more complex relationships than distances between classifications.

As described above, based on the comparisons between different sets of predicted classifications as well as between predicted classifications and ground truth labels, the knowledge distillation system 102 learns parameters for the distilled neural network 118. In particular, the knowledge distillation system 102 determines one or more measures of loss associated with the various comparisons described above and further modifies the parameters of the distilled neural network 118 to reduce the measure(s) of loss. Indeed, over multiple training iterations of classifying different digital images, applying loss functions to compare classifications, and modifying parameters to reduce loss(es) associated with the loss functions, the knowledge distillation system 102 learns parameters for the distilled neural network 118 that result in the distilled neural network 118 mimicking predictions of the source neural network 116.

As further illustrated in FIG. 3, in some embodiments, the knowledge distillation system 102 performs an act 318 to utilize a distilled neural network to classify a digital image. In particular, the knowledge distillation system 102 utilizes the distilled neural network 118 with parameters learned from the source neural network 116 to determine a classification for a digital image in response to a query or a request from a client device (e.g., the illustrated mobile device). As shown, the knowledge distillation system 102 applies or utilize the trained distilled neural network 116 to generate a classification of "Dog" for the digital image of the dog shown on the client device. The knowledge distillation system 102 further provides the classification and the digital image for display on the client device. Indeed, as described herein, the knowledge distillation system 102 trains an accurate distilled neural network 118 that is lightweight (e.g., as compared to the source neural network 116) and is more viable for implementation as part of a mobile application on a mobile device where computing resources are limited.

Figure 4A:
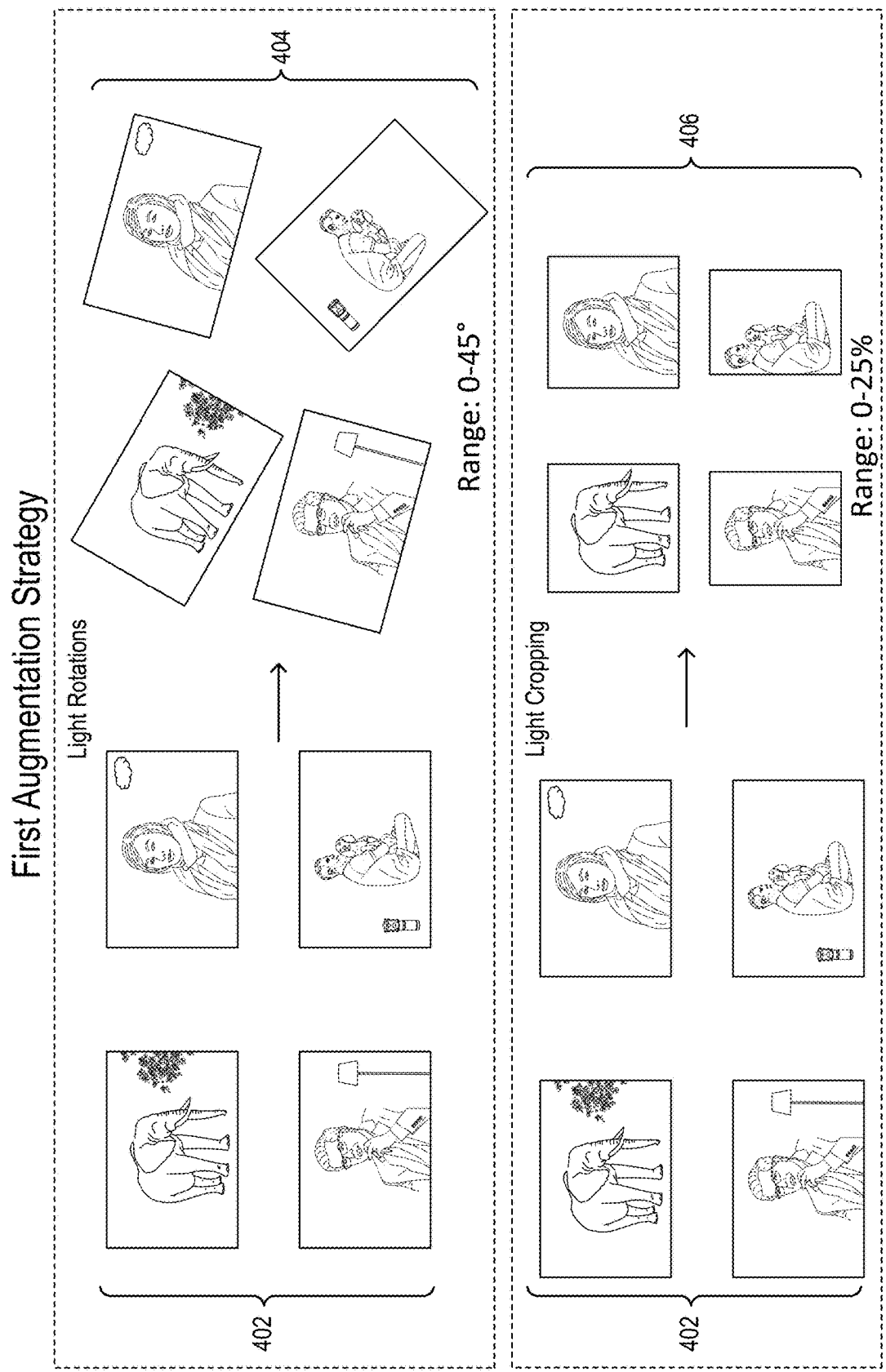
FIGS. 4A-4B illustrate example augmentation strategies for augmenting digital images in accordance with one or more embodiments.

As mentioned above, in some embodiments, the knowledge distillation system 102 generates a set of lightly augmented digital images utilizing a first augmentation strategy. In some cases, an augmentation strategy refers to a method or a process of augmenting digital images corresponding to a particular augmentation range. Along these lines, a light augmentation strategy refers to a process of augmenting digital images with various augmentations in accordance with a light augmentation range. In particular, the knowledge distillation system 102 generates a set of lightly augmented digital images by slightly rotating or slightly cropping a set of digital images. FIG. 4A illustrates generating a set of lightly augmented digital images in accordance with one or more embodiments.

As illustrated in FIG. 4A, the knowledge distillation system 102 generates a set of lightly augmented digital images 404 or 406 from an initial set of digital images 402. For example, as illustrated in the top dashed box, the knowledge distillation system 102 performs light rotations to the set of digital images 402 to generate the set of lightly augmented digital images 404. As shown, the knowledge distillation system 102 slightly rotates the digital images varying amounts. Indeed, the knowledge distillation system 102 rotates the digital images between a range of 1 to 45 degrees, in accordance with a light rotation range.

As further shown in FIG. 4A, the knowledge distillation system 102 generates the set of lightly augmented digital image 406 from the set of digital images 402. In particular, the knowledge distillation system 102 slightly crops the digital images to remove small portions of the digital images, in accordance with a light augmentation range. As shown, the knowledge distillation system 102 crops out between 1 to 25 percent of the digital images to generate the set of lightly augmented digital images 406. Although FIG. 4A depicts particular augmentation ranges for the light rotation range and the light cropping range, other ranges are also possible. For example, in some embodiments, the knowledge distillation system 102 lightly rotates digital images within a range of 1 to 30 degrees or 10 to 50 degrees, or along some other range of slight rotations (e.g., below a threshold degree of rotation). As another example, the knowledge distillation system 102 lightly crops digital images to remove 1 to 30 percent of the digital images, or 5 to 15 percent, or in accordance with some other range (e.g., below a threshold percentage of cropping).

Figure 4B:
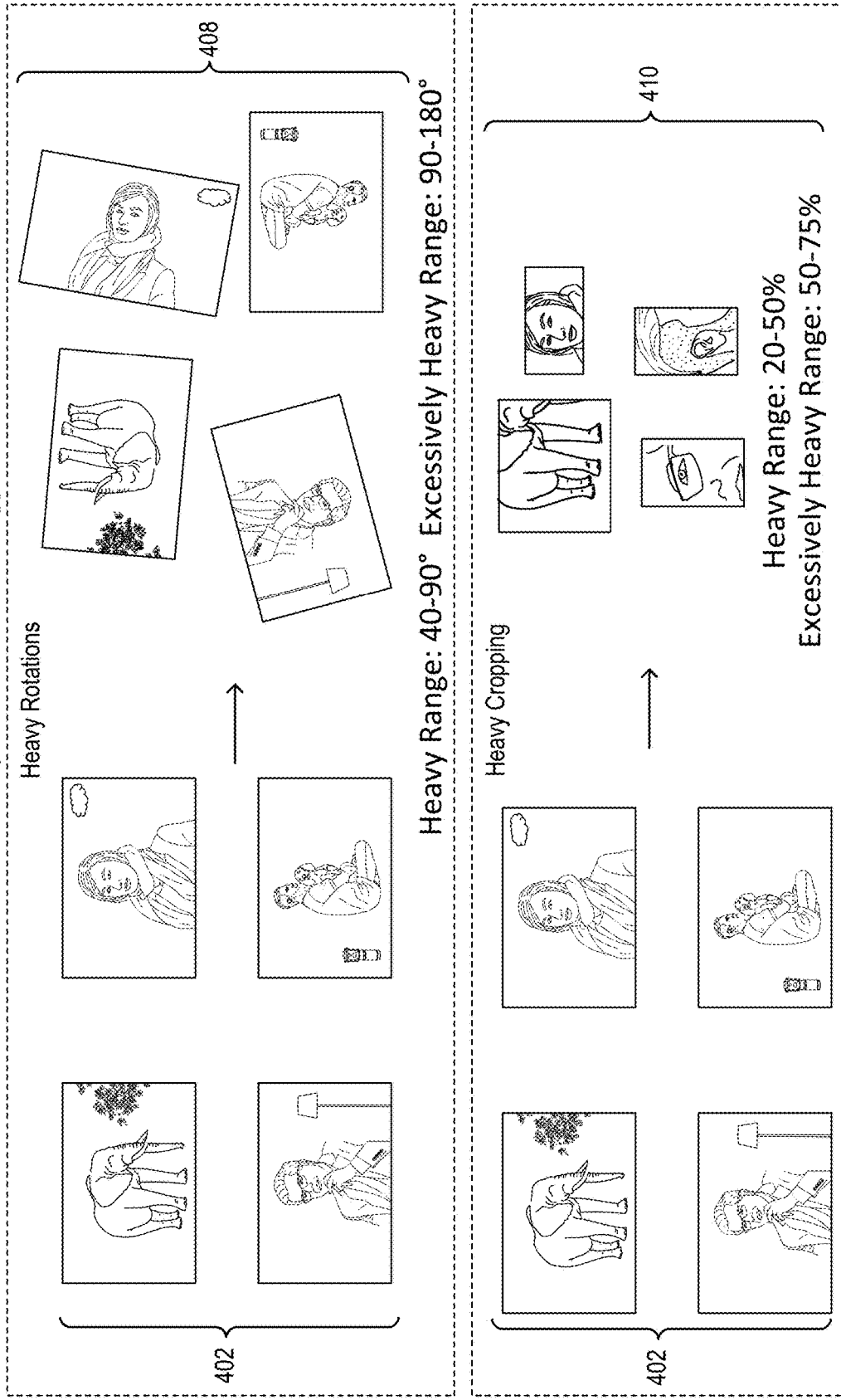

As mentioned above, in some embodiments the knowledge distillation system 102 generates a set of heavily augmented digital images utilizing a second augmentation strategy. For instance, the knowledge distillation system 102 utilizes a heavy augmentation strategy. In some cases, a heavy augmentation strategy refers to a method or a process of augmenting digital images according to a heavy augmentation range. Specifically, the knowledge distillation system 102 generates a set of heavily augmented digital images by heavily rotating or heavily cropping a set of digital images. FIG. 4B illustrates generating a set of heavily augmented digital images in accordance with one or more embodiments.

As illustrated in FIG. 4B, the knowledge distillation system 102 heavily augments the set of digital images 402 to generate the set of heavily augmented digital images 408 and the set of heavily augmented digital images 410. As shown in the upper dashed box, the knowledge distillation system 102 heavily rotates the digital images within the set of digital images 402 to generate the set of heavily augmented digital images 410. For heavy augmentation, for instance, the knowledge distillation system 102 rotates the digital images by varying amounts within a heavy rotation range of 40 to 90 (or some other range above a first threshold rotation and below a second threshold rotation). For excessively heavy augmentation (which is a subset of heavy augmentation), the knowledge distillation system 102 rotates the digital images by varying amounts within a range of 90 to 180 degrees (or some other range above a threshold rotation).

As shown in the lower dashed box, the knowledge distillation system 102 generates the set of heavily augmented digital images 410 by heavily cropping digital images within the set of digital images 402. For example, the knowledge distillation system 102 crops larger portions out of the digital images than is done for light augmentation. As shown for a heavy cropping range, for example, the knowledge distillation system 102 crops digital images to remove 20 to 50 percent of the digital images (or some other range above a first cropping threshold and below a second cropping threshold). For excessively heavy cropping, the knowledge distillation system 102 crops the digital images to remove portions of the digital images within a range of 50 to 75 percent (or some other range above a cropping threshold).

As mentioned above, in certain embodiments, the knowledge distillation system 102 generates heavily augmented digital images that have some overlap with lightly augmented digital images. Indeed, as shown in FIGS. 4A-4B, the light augmentation ranges have some small measure of overlap with the heavy augmentation ranges for both rotation and cropping. In some embodiments, the knowledge distillation system 102 implements excessively heavy augmentation for digital images where the resultant excessively heavily augmented digital images have no overlap with—i.e., they are mutually exclusive from—the lightly augmented digital images. As shown in FIGS. 4A-4B, for example, the excessively heavy augmentation ranges are mutually exclusive from the light augmentation ranges for both rotation and cropping.

To perform the augmentations illustrated in FIGS. 4A-4B, the knowledge distillation system 102 samples from an augmentation range to select a particular degree of augmentation to apply to a digital image. More specifically, to augment a digital image, in some cases, the knowledge distillation system 102 randomly samples from an augmentation range (e.g., a light augmentation range, a heavy augmentation range, or an excessively heavy augmentation range) to select a number of degrees to rotate a digital image or a percentage of the digital image to crop out (or a measure of some other augmentation to apply). The knowledge distillation system 102 further applies the selected augmentation to the digital image. Further, the knowledge distillation system 102 repeats the process to sample from an augmentation range to generate additional augmented digital images to form a set of augmented digital images. In one or more embodiments, the knowledge distillation system 102 samples from an augmentation range in accordance with a probability distribution other than random sampling (e.g., a normal distribution across the augmentation range).

Additionally, while FIGS. 4A-4B illustrate two example augmentation techniques, rotating and cropping, in some embodiments, the knowledge distillation system 102 performs additional or alternative augmentation techniques as well. For instance, the knowledge distillation system 102 scales (e.g., resizes), flips, blurs, pixelates, modifies visual parameters, or adds artifacts to digital images.

Figure 5:
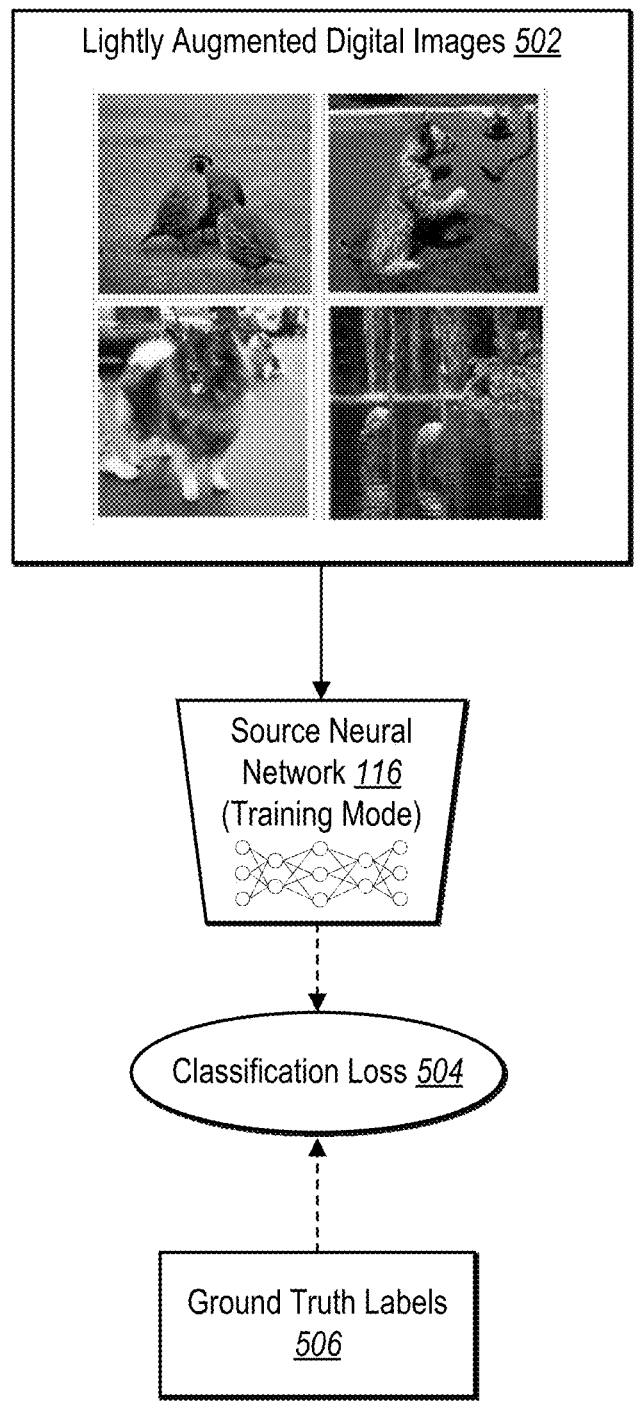
FIG. 5 illustrates an example flow for learning parameters for a source neural network in accordance with one or more embodiments.

As further mentioned above, in one or more embodiments, the knowledge distillation system 102 learns parameters for the source neural network 116. In particular, the knowledge distillation system 102 utilizes a training or tuning process based on lightly augmented digital images to learn parameters for the source neural network 116. FIG. 5 illustrates an example training processing for learning parameters of the source neural network 116 in accordance with one or more embodiments.

As illustrated in FIG. 5, the knowledge distillation system 102 trains or tunes the source neural network 116 to learn its parameters from a set of lightly augmented digital images 502. To elaborate, the knowledge distillation system 102 accesses (e.g., from the database 114) or generates a set of lightly augmented digital images 502 (e.g., the set of lightly augmented digital images 404 or 406) to input into the source neural network 116. As described above, the source neural network 116 generates predicted classifications for the set of lightly augmented digital images 502.

As further illustrated in FIG. 5, the knowledge distillation system 102 further utilizes a classification loss 504 to determine a measure of loss or error associated with the predictions of the source neural network 116. More specifically, the knowledge distillation system 102 compares predicted classifications of the set of lightly augmented digital images 502 with corresponding ground truth labels 506 using the classification loss 504. In some embodiments, the knowledge distillation system 102 further modifies parameters of the source neural network 116 to reduce or minimize the classification loss 504. For instance, the knowledge distillation system 102 modifies parameters of the source neural network 116 in accordance with an objective function given by:

$$\underset{\theta_T}{\operatorname{argmin}} CE(T(A(x)), y)$$

where T represents the source neural network 116 (e.g., a "teacher" neural network), $\theta_T$ represents the parameters or weights of the source neural network 116, CE(•) represents a cross entropy loss function (e.g., for the classification loss 504), A(•) represents an augmentation function (e.g., consisting of one or more augmentation techniques such as resizing, cropping, and horizontal flipping), T(A(x)) represents a predicted classification of the source 116 for an augmented digital image x, and y represents a ground truth label for the digital image x. For discussion purposes, the definitions of the terms and variables persists from FIG. 5 through FIGS. 6A-6B.

Figure 6A:
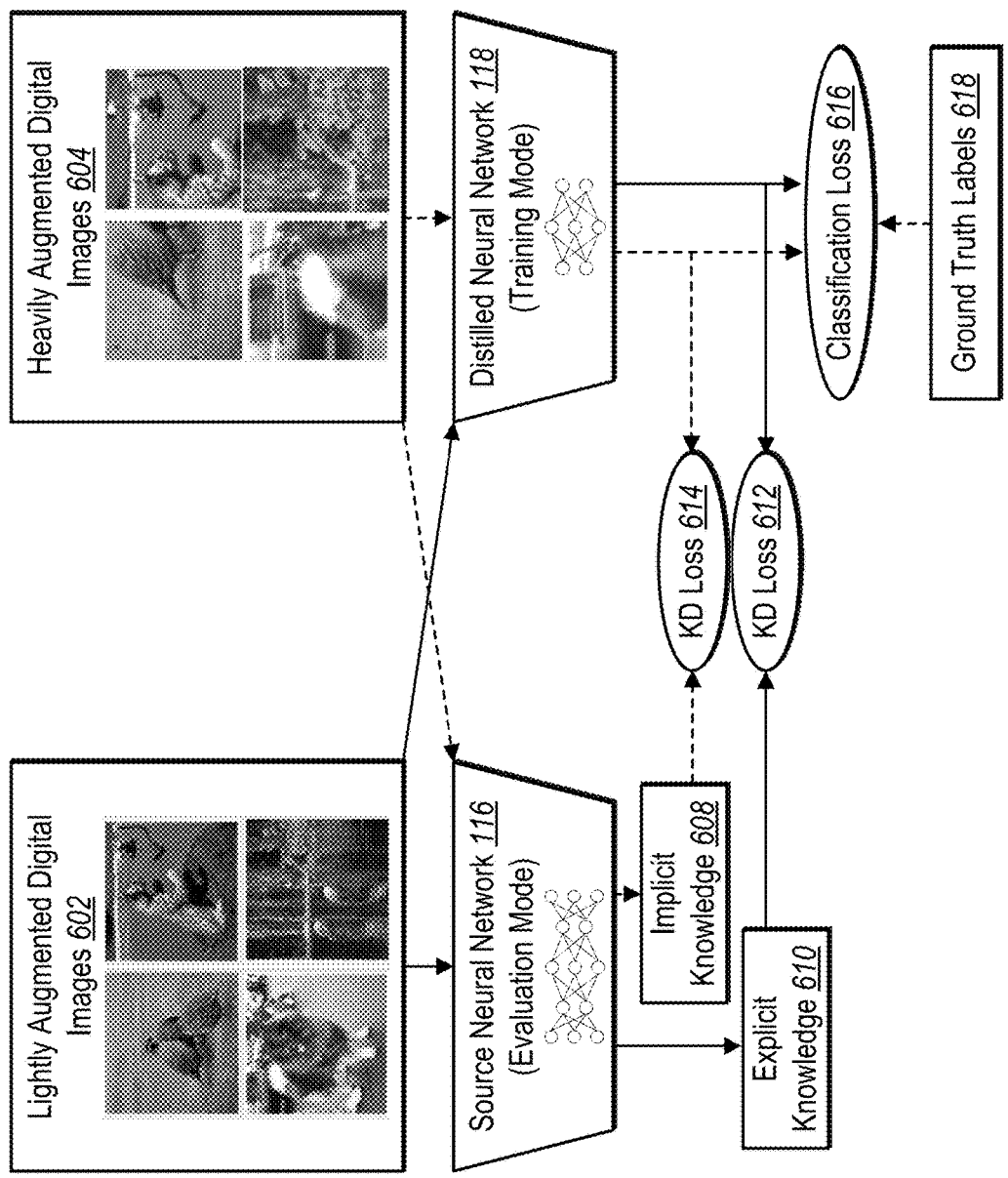
FIGS. 6A-6B illustrate example flows for learning parameter for a distilled neural network utilizing multiple augmentation strategies in accordance with one or more embodiments.

As mentioned, in one or more embodiments, the knowledge distillation system 102 trains or tunes the distilled neural network 118 based on the learned parameters of the source neural network 116. In particular, the knowledge distillation system 102 transfers learned parameters from the source neural network 116 to the distilled neural network 118 utilizing multiple augmentation strategies—light augmentation and heavy augmentation (or excessively heavy augmentation). FIG. 6A illustrates learning parameters for the distilled neural network 118 utilizing light augmentation and heavy augmentation in accordance with one or more embodiments.

As illustrated in FIG. 6A, the knowledge distillation system 102 learns parameters of the distilled neural network 118 utilizing both explicit knowledge 610 and implicit knowledge 608. In some embodiments, explicit knowledge refers to parameters of the source neural network 116 that are learned from lightly augmented digital images (e.g., the set of lightly augmented digital images 502). For example, the parameters learned from lightly augmented digital images are explicit knowledge because the source neural network 116 is trained directly on the lightly augmented digital images. Implicit knowledge, on the other hand, refers to parameters learned from digital images on which the source neural network 116 is not directly trained. For example, implicit knowledge refers to parameters learned from classifying heavily augmented digital images using parameters from lightly augmented digital images.

As shown in FIG. 6A, the knowledge distillation system 102 uses a light augmentation strategy for learning parameters of the source neural network 116 and utilizes a heavy augmentation strategy for learning parameters of the distilled neural network 118. In this way, the knowledge distillation system 102 trains the source neural network 116 on a lighter augmentation strategy but uses the source neural network 116 to provide guidance to the distilled neural network 118 during the training of the distilled neural network 118. As a basis for this guidance, the knowledge distillation system 102 learns parameters for the source neural network 116 from the lightly augmented digital images 602, as described above in relation to FIG. 5. The solid lines in FIG. 6A correspond to the lightly augmented digital images 602, while the dashed lines refer to the heavily augmented digital images 604.

The knowledge distillation system 102 utilizes the source neural network 116 to generate predicted classifications for the lightly augmented digital images 602. In addition, the knowledge distillation system 102 learns parameters (e.g., the explicit knowledge 610) for the source neural network 116 in accordance with an objective function to reduce or minimize measures of loss associated with the predicted classifications (as compared to ground truth labels). As described above, the knowledge distillation system 102 utilizes an objective function such as:

$$\underset{\theta_T}{\operatorname{argmin}} CE(T(A_\mathbb{L}(x)), y)$$

where $\mathbb{L}$ refers to light augmentation and $A_\mathbb{L}(\cdot)$ refers to a light augmentation strategy (for augmenting digital images in accordance with a light augmentation range). In one or more embodiments, the knowledge distillation system 102 reduces the intensity of a heavy augmentation strategy $A_\mathbb{H}(\cdot)$ to learn parameters for the source neural network 116 based on a light augmentation strategy $A_\mathbb{L}(\cdot)$. In the scope of heavy augmentation, the light augmentation strategy $A_\mathbb{L}(\cdot)$ is a subset of the heavy augmentation strategy $A_\mathbb{H}(\cdot)$, i.e., $A_\mathbb{L}(\cdot) \subseteq A_\mathbb{H}(\cdot)$. Thus, the heavy augmentation strategy $A_\mathbb{H}(\cdot)$ has a wider augmentation range than the light augmentation strategy $A_\mathbb{L}(\cdot)$.

In some embodiments, the knowledge distillation system 102 transfers or distills the explicit knowledge 610, or the parameters learned from lightly augmented digital images, from the source neural network 116 to the distilled neural network 118 utilizing a knowledge distillation ("KD") loss function 612. In particular, the knowledge distillation system 102 utilizes the distilled neural network 118 to generate predicted classifications for the lightly augmented digital images 602 and then compares the predicted classifications with those of the source neural network 116. Indeed, the knowledge distillation system 102 compares the respective classifications for the lightly augmented digital images 602 generated by the source neural network 116 and the distilled neural network 118 using the knowledge distillation loss function 612.

In a similar fashion, the knowledge distillation system 102 transfers the implicit knowledge 608, or parameters of the source neural network 116 used to classify the heavily augmented digital images 604 while trained on the lightly augmented digital images 602, to the distilled neural network 118 using the knowledge distillation loss function 614. For instance, the knowledge distillation system 102 utilizes the distilled neural network 118 to generate predicted classifications for the heavily augmented digital images 604 and compares the classifications with those generated by the source neural network 116 via the knowledge distillation loss function 614.

In some embodiments, the knowledge distillation system 102 also compares classifications generated by the distilled neural network 118 with ground truth labels 618 utilizing a classification loss function 616. For instance, the knowledge distillation system 102 compares classifications of the lightly augmented digital images 602 and classifications of the heavily augmented digital images 604 with corresponding ground truth labels 618. Based on comparing classifications of the distilled neural network 118 with the ground truth labels 618 and with classifications generated by the source neural network 116, the knowledge distillation system 102 back propagates to modify parameters of the distilled neural network 118. Indeed, the knowledge distillation system 102 modifies parameters of the distilled neural network 118 to reduce or minimize one or more measures of loss associated with the classification loss function 616, the knowledge distillation loss function 612, and/or the knowledge distillation loss function 614. The knowledge distillation system 102 thus learns parameters for the distilled neural network 118 from the parameters of the source neural network 116.

In one or more embodiments, the knowledge distillation system 102 learns parameters for the distilled neural network 118 in accordance with an objective function given by:

$$\operatorname*{argmin}_{\theta_S} \alpha CE(z_{S,\mathbb{H}}, y) + (1-\alpha)\tau^2 KL\left(\sigma\left(\frac{z_{S,\mathbb{H}}}{\tau}\right), \sigma\left(\frac{T(q_{\mathbb{H}})}{\tau}\right)\right)$$

where S refers to the distilled neural network 118 (e.g., a "student" neural network), $z_S = S(A(x))$ KL refers to Kullback-Leibler divergence loss, $q_{\mathbb{H}} = A_{\mathbb{H}}(x)$, $z_{S,\mathbb{H}} = S(q_{\mathbb{H}})$, σ is the softmax function, τ is the softmax temperature hyperparameter, and α is the loss weighting hyperparameter.

In one or more embodiments, the first term $\alpha CE(z_{S,\mathbb{H}}, y)$ refers to the classification loss function 616, and the second term $$(1-\alpha)\tau^2 KL\left(\sigma\left(\frac{z_{S,\mathbb{H}}}{\tau}\right), \sigma\left(\frac{T(q_{\mathbb{H}})}{\tau}\right)\right)$$

refers to the knowledge distillation loss function 614. Additionally (or alternatively), the knowledge distillation system 102 utilizes a modified version of the above objective function to learn parameters of the distilled neural network 118 based on the lightly augmented digital images 602 by, for example, replacing the $\mathbb{H}$ terms with corresponding $\mathbb{L}$ terms. Indeed, the knowledge distillation system 102 utilizes two loss functions, cross entropy loss and Kullback-Leibler divergence loss, to train the distilled neural network 118. The knowledge distillation system 102 distills knowledge or transfers parameters from the source neural network 116 to the distilled neural network 118 through the second (KL) loss term. In some cases, the knowledge distillation system 102 sets the value of τ greater than 1 to control softness or flatness of output distribution of T for increasing/decreasing the influence of T's non-maximum predicted classes.

Figure 6B:
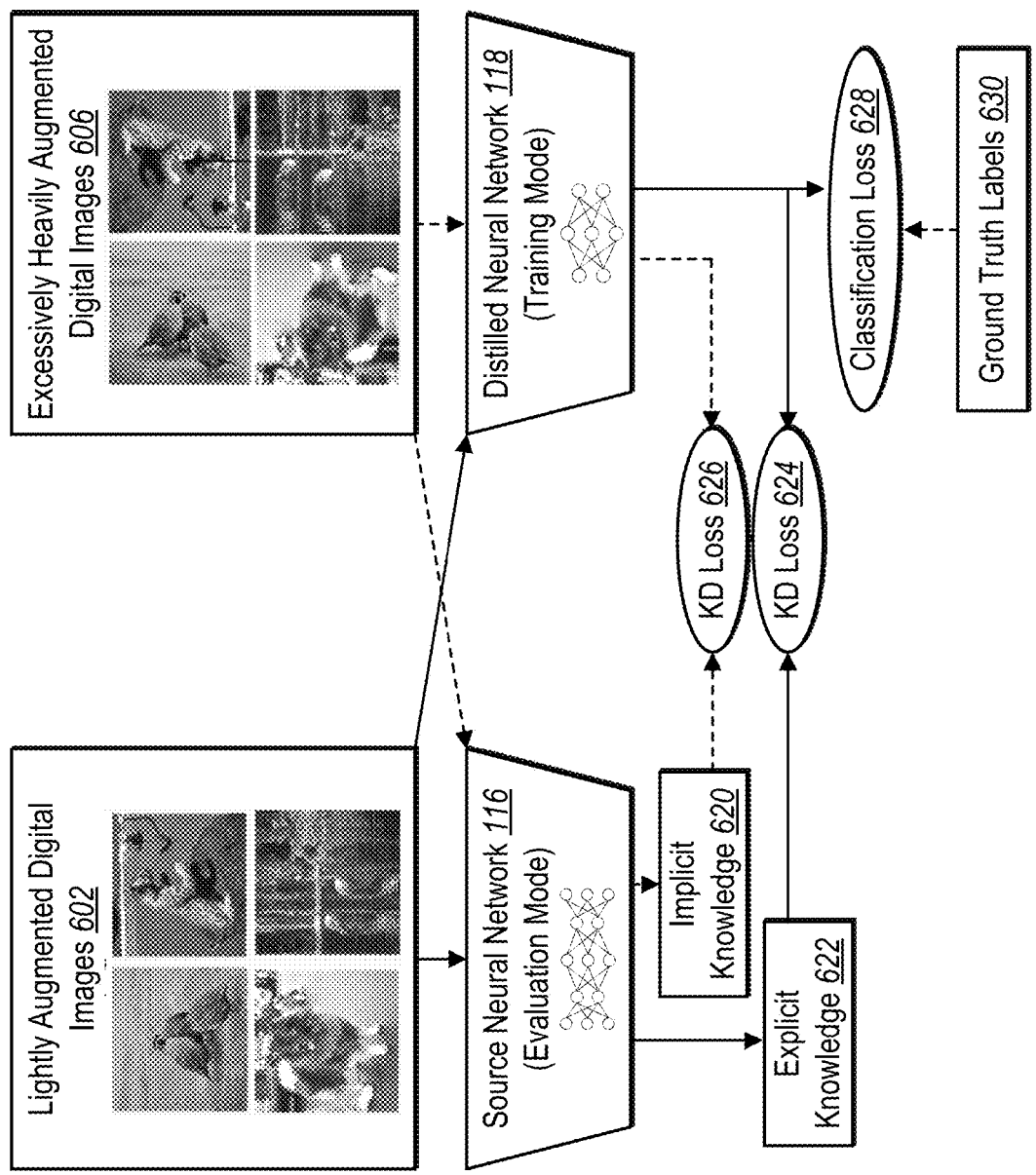

As mentioned above, in certain embodiments, the knowledge distillation system 102 implements excessively heavy augmentation for digital images as part of the knowledge distillation process. In particular, the knowledge distillation system 102 utilizes more extreme or more excessive augmentations for the digital images to train the distilled neural network 118. FIG. 6B illustrates learning parameters for the distilled neural network 118 based on excessively heavy augmentation in accordance with one or more embodiments. Similar to the discussion above in relation to FIG. 6A, the solid lines in FIG. 6B correspond to the lightly augmented digital images 602, while the dashed lines refer to the excessively heavily augmented digital images 606.

As illustrated in FIG. 6B, the knowledge distillation system 102 implements the same process described above to learn parameters for the source neural network 116. Particularly, the knowledge distillation system 102 inputs the lightly augmented digital images 602 into the source neural network 116 to generate predicted classifications. The knowledge distillation system 102 further utilizes a classification loss function to compare the predicted classifications with ground truth labels. Based on the determined measures of loss, the knowledge distillation system 102 modifies parameters of the source neural network 116 to reduce or minimize the loss.

In addition, the knowledge distillation system 102 transfers learned parameters from the source neural network 116 to the distilled neural network 118. Particularly, the knowledge distillation system 102 transfers the explicit knowledge 622 and the implicit knowledge 620 from the source neural network 116 to the distilled neural network 118. For instance, the knowledge distillation system 102 utilizes the distilled neural network 118 to generate classifications for the lightly augmented digital image 602 and compares the classifications with those from the source neural network 116. Specifically, the knowledge distillation system 102 utilizes the knowledge distillation loss function 624 to compare the classifications for the lightly augmented digital images 602 generated by the distilled neural network 118 and the source neural network 116.

In addition, the knowledge distillation system 102 utilizes the source neural network 116 to generate classifications for the excessively heavily augmented digital images 606 based on the parameters learned from the lightly augmented digital images 602. The knowledge distillation system 102 further utilizes the distilled neural network 118 to generate classifications for the excessively heavily augmented digital images 606. From the generated classifications of both networks, the knowledge distillation system 102 compares the classifications via the knowledge distillation loss function 626.

As further illustrated in FIG. 6B, the knowledge distillation system 102 utilizes a classification loss function 628 to compare classifications for the lightly augmented digital images 602 generated by the distilled neural network 118 with corresponding ground truth labels 630. In one or more embodiments, the knowledge distillation system 102 does not utilize the classification loss function 628 (or any other classification loss function) to compare classifications for the excessively heavily augmented digital images 606 with the ground truth labels 630. Specifically, the knowledge distillation system 102 often generates an excessively heavily augmented digital image by modifying an original digital image to such a degree that a corresponding ground truth label no longer applies. Indeed, as illustrated above with regard to FIG. 5, am excessively heavily augmented digital image of an elephant may be cropped to the point where the only an eye, a hoof, or a tail remain. Thus, the ground truth label "elephant" no longer applies because "elephant" no longer describes what is depicted in the excessively heavily augmented digital image. To account for these circumstances, in some cases, the knowledge distillation system 102 trains the distilled neural network 118 with excessively heavily augmented digital images utilizing the knowledge distillation loss function loss function 626 and without using the classification loss function 628 or the ground truth labels 630 (which may not accurately describe the excessively heavily augmented digital images).

Based on the measure(s) of loss associated with the classification loss function 628, the knowledge distillation loss function 624, and/or the knowledge distillation loss function 626, the knowledge distillation system 102 further back propagates to modify parameters of the distilled neural network 118. Particularly, the knowledge distillation system 102 modifies parameters of the distilled neural network 118 to reduce or minimize one or more of the measures of loss. Thus, the knowledge distillation system 102 learns parameters for the distilled neural network 118 that result in satisfactory loss and that accurately generate classifications for digital images.

In certain embodiments, the knowledge distillation system 102 learns the parameters for the distilled neural network 118 in accordance with an objective function given by:

$$\operatorname*{argmin}_{\theta_s} \alpha CE(z_{S,\mathbb{L}}, y) + \frac{(1-\alpha)}{2}\left(\tau_\mathbb{L}^2 KL\left(\sigma\left(\frac{z_{S,\mathbb{L}}}{\tau_\mathbb{L}}\right), \sigma\left(\frac{T(q_\mathbb{L})}{\tau_\mathbb{L}}\right)\right) + \tau_\mathbb{H}^2 KL\left(\sigma\left(\frac{z_{S,\mathbb{H}}}{\tau_\mathbb{H}}\right), \sigma\left(\frac{T(q_\mathbb{H})}{\tau_\mathbb{H}}\right)\right)\right)$$

where $q_\mathbb{L} = A_\mathbb{L}(x)$, $q_\mathbb{H} = A_\mathbb{H}(x)$, $z_{S,L} = S(q_\mathbb{L})$, and $z_{S,\mathbb{H}} = S(q_\mathbb{H})$. $\mathbb{L}$ and $\mathbb{H}$ share the same mini-batch of digital images x. In one or more embodiments, the first term $\alpha CE(z_{S,\mathbb{L}}, y)$ refers to the classification loss function 628, while the second term $$\frac{(1-\alpha)}{2}\tau_\mathbb{L}^2 KL\left(\sigma\left(\frac{z_{S,\mathbb{L}}}{\tau_\mathbb{L}}\right), \sigma\left(\frac{T(q_\mathbb{L})}{\tau_\mathbb{L}}\right)\right)$$

refers to the knowledge distillation loss function 624, and the third term $$\frac{(1-\alpha)}{2}\tau_\mathbb{H}^2 KL\left(\sigma\left(\frac{z_{S,\mathbb{H}}}{\tau_\mathbb{H}}\right), \sigma\left(\frac{T(q_\mathbb{H})}{\tau_\mathbb{H}}\right)\right)$$

refers to the knowledge distillation loss function 626.

In some embodiments, the knowledge distillation system 102 trains the source neural network 116 ("T") on a comparatively lighter augmentation strategy $A_\mathbb{L}(\cdot)$ of the same type (e.g., as described above in relation to FIG. 5). Unlike the heavy augmentation in FIG. 6A, however, the light augmentation strategy $A_\mathbb{L}(\cdot)$ is not a subset of the excessively heavy augmentation strategy $A_\mathbb{H}(\cdot)$. Indeed, the lightly augmented digital images 602 generated via the light augmentation strategy $A_\mathbb{L}(\cdot)$ do not have any overlaps with the excessively heavily augmented digital images 606 generated via the excessively heavy augmentation strategy $A_\mathbb{H}(\cdot)$. As a result, the knowledge distillation system 102 limits the classification loss (e.g., the cross entropy loss CE term) to only the lightly augmented digital images 602. Limiting the classification loss in this way prevents the distilled neural network 118 from trying too hard to learn to correctly predict ground truth labels given the excessively heavily augmented digital images 606 and corrupting its training.

Although FIGS. 6A-6B illustrate using either heavily or excessively heavily augmented digital images for training the distilled neural network 118, in some embodiments, the knowledge distillation system 102 uses both approaches. For example, the knowledge distillation system 102 utilizes a combination of the heavily augmented digital images 604 and the excessively heavily augmented digital images 606 to learn parameters for the distilled neural network 118. In one or more embodiments, the knowledge distillation system 102 trains over one or more iterations using the heavily augmented digital images 604 and trains over one or more additional iterations using the excessively heavily augmented digital images 606.

As mentioned above, the knowledge distillation system 102 can provide performance advantages over conventional systems. Indeed, researchers have demonstrated the improvements of one or more embodiments of the knowledge distillation system 102 in relation to conventional systems. Comparing training techniques of conventional systems with those of one or more embodiments of the knowledge distillation system 102, researchers evaluated performance of several neural network architectures, such as ResNet-18, ResNet-34, WideResNet 16-8, WideResNet 34-5, and DenseNetBC 40-60, among others, using digital images from different databases such as CIFAR-10, CIFAR-100, and Mini-ImageNet. FIG. 7 illustrates a table of results demonstrating the advantages of explicit-implicit training with varied augmentation strategies in accordance with one or more embodiments.

For the table in FIG. 7, the experiments were performed with heavy random cropping (with a crop area as small as 8% of the total image area and a variable crop aspect ratio) on digital images from Mini-ImageNet. For the tested network architectures, experimenters set the knowledge distillation loss hyperparameter $\alpha$ in a range of [0, . . . , 0.9] with a step size of 0.1, set the softmax temperature parameter $\tau$ (including $\tau_\mathbb{L}$) to 4, and set $\tau_\mathbb{H}$ to 2. As illustrated in FIG. 7, the table shows results for conventional standalone training of the ResNet-34 network and the ResNet-18 network, using different degrees of cropping augmentation for digital images (e.g., light and heavy). Compared to these results, the table also illustrates marked improvement in prediction accuracy when training a distilled neural network in the form of ResNet-18 from parameters of a source neural network in the form of ResNet-34. The improvement is especially pronounced when implementing explicit-implicit training using light augmentation for the source neural network (ResNet-34) and heavy augmentation for the distilled neural network, as shown in the last row of the table.

As further mentioned above, the example implementation of the knowledge distillation system 102 utilizes excessively heavy augmentation as part of the transferring learned parameters from a source neural network to a distilled neural network to improve prediction accuracy. Researchers have further demonstrated the accuracy improvements of this technique in addition to heavy augmentation. FIGS. 8A-8B illustrate tables of results demonstrating the advantages of explicit-implicit training with excessively heavy augmentations in accordance with one or more embodiments.

As illustrated in FIG. 8A, the table depicts results of experimentation for the ResNet-18 and ResNet-34 neural networks on digital images from Mini-ImageNet. Researchers utilized excessively heavy augmentation in the form of excessive rotations (e.g., 90 degree, 180 degree, and 270 degree rotations). As shown, the standalone training of the ResNet-34 and the ResNet-18 neural networks result in accuracies of 67.46% and 66.52%, respectively. The table further illustrates the results of utilizing the knowledge distillation system 102 to train the ResNet-18 neural network as a distilled neural network from parameters of the source neural network, ResNet-34. Indeed, the bottom row of the table illustrates an accuracy of 69.45% that results from training the distilled neural network using explicit-implicit knowledge distillation from normal (non-rotated) digital images and excessively rotated digital images.

FIG. 8B illustrates improvements of explicit-implicit knowledge distillation of one or more embodiments of the knowledge distillation system 102 utilizing both light and (excessively) heavy augmentation. The table depicts experiment results of excessively heavy augmentation evaluation over the CIFAR-100 dataset. As compared to conventional systems that do no implement such techniques (represented in the table as "baseline" or explicit "traditional" systems), the results of explicit-implicit knowledge distillation provide improved accuracy. Indeed, along with the accuracy of different source neural networks, the table illustrates accuracies of various distilled neural networks that result from different training techniques.

Figure 9:
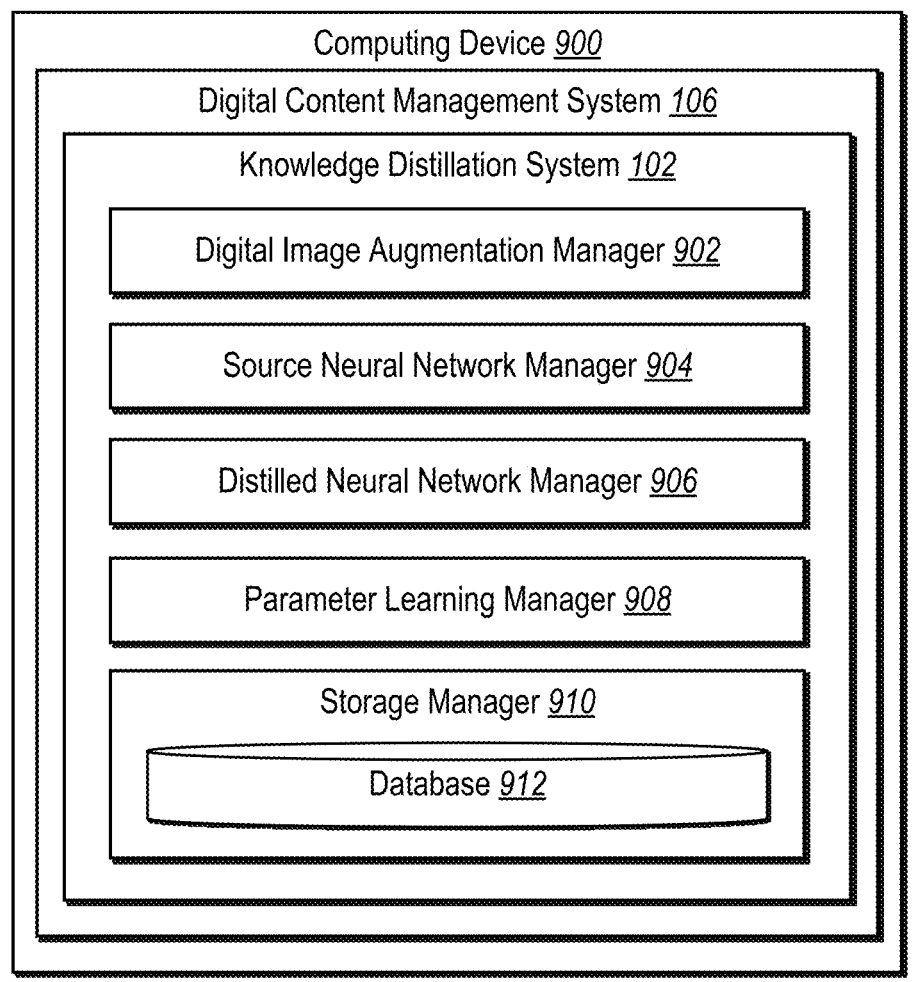
FIG. 9 illustrates a schematic diagram of a knowledge distillation system in accordance with one or more embodiments.

Looking now to FIG. 9, additional detail will be provided regarding components and capabilities of the knowledge distillation system 102. Specifically, FIG. 9 illustrates an example schematic diagram of the knowledge distillation system 102 on an example computing device 900 (e.g., one or more of the client device 108 and/or the server(s) 104. As shown in FIG. 9, the knowledge distillation system 102 includes a digital image augmentation manager 902, a source neural network manager 904, a distilled neural network manager 906, a parameter learning manager 908, and a storage manager 910.

As just mentioned, the knowledge distillation system 102 includes a digital image augmentation manager 902. In particular, the digital image augmentation manager 902 manages, maintains, generates, accesses, augments, modifies, or identifies augmented digital images. For example, the digital image augmentation manager 902 identifies digital images by communicating with the storage manager 910 to access the database 114 storing the digital images. In addition, the digital image augmentation manager 902 augments the digital images in accordance with a light augmentation strategy, a heavy augmentation strategy, and/or an excessively heavy augmentation strategy. For instance, the digital image augmentation manager 902 rotates, crops, flips, blurs, pixelates, adds artifacts to, resizes, or otherwise augments digital images.

In addition, the knowledge distillation system 102 includes a source neural network manager 904. In particular, the source neural network manager 904 manages, applies, or utilizes a source neural network. For instance, the source neural network manager 904 maintains a source neural network to utilize for transferring parameters to a distilled neural network. In addition, the source neural network manager 904 utilizes a trained source neural network to classify one or more digital images.

Further, the knowledge distillation system 102 includes a distilled neural network manager 906. In particular, the distilled neural network manager 906 manages, maintains, applies, or utilizes a distilled neural network. For example, the distilled neural network manager 906 maintains a distilled neural network trained with parameters from a source neural network. In addition, the distilled neural network manager 906 utilizes a distilled neural network to classify digital images.

As illustrated, the knowledge distillation system 102 also includes a parameter learning manager 908. In particular, the parameter learning manager 908 manages, maintains, determines, trains, tunes, learns, generates, accesses, transfers, distills, or identifies parameters for a source neural network and a distilled neural network. Indeed, the parameter learning manager 908 communicates with the source neural network manager 904 and the distilled neural network manager 906 to train neural networks as described herein. For instance, the parameter learning manager 908 transfers parameters learned for a source neural network to a distilled neural network using an explicit-implicit knowledge distillation technique based on both lightly augmented digital images and (excessively) heavily augmented digital images.

The knowledge distillation system 102 further includes a storage manager 910. The storage manager 910 operates in conjunction with or include one or more memory devices such as the database 912 (e.g., the database 114) that store various data such as digital images, augmented digital images, algorithms for a source neural network and a training neural network, and instructions for training such neural networks. The storage manager 910 (e.g. via a non-transitory computer memory/one or more memory devices) stores and maintain data associated with augmenting digital images and training neural networks (e.g., within the database 912).

In one or more embodiments, each of the components of the knowledge distillation system 102 are in communication with one another using any suitable communication technologies. Additionally, the components of the knowledge distillation system 102 is in communication with one or more other devices including one or more client devices described above. It will be recognized that although the components of the knowledge distillation system 102 are shown to be separate in FIG. 9, any of the subcomponents may be combined into fewer components, such as into a single component, or divided into more components as may serve a particular implementation. Furthermore, although the components of FIG. 9 are described in connection with the knowledge distillation system 102, at least some of the components for performing operations in conjunction with the knowledge distillation system 102 described herein may be implemented on other devices within the environment.

The components of the knowledge distillation system 102 can include software, hardware, or both. For example, the components of the knowledge distillation system 102 can include one or more instructions stored on a computer-readable storage medium and executable by processors of one or more computing devices (e.g., the computing device 900). When executed by the one or more processors, the computer-executable instructions of the knowledge distillation system 102 can cause the computing device 900 to perform the methods described herein. Alternatively, the components of the knowledge distillation system 102 can comprise hardware, such as a special purpose processing device to perform a certain function or group of functions. Additionally or alternatively, the components of the knowledge distillation system 102 can include a combination of computer-executable instructions and hardware.

Furthermore, the components of the knowledge distillation system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the knowledge distillation system 102 may be implemented as part of a stand-alone application on a personal computing device or a mobile device. Alternatively or additionally, the components of the knowledge distillation system 102 may be implemented in any application that allows creation and delivery of marketing content to users, including, but not limited to, applications in ADOBE EXPERIENCE MANAGER and ADOBE CREATIVE CLOUD, such as ADOBE ILLUSTRATOR, ADOBE PHOTOSHOP, and ADOBE INDESIGN. "ADOBE," "ADOBE EXPERIENCE MANAGER," "ADOBE CREATIVE CLOUD," "ADOBE ILLUSTRATOR," "ADOBE PHOTOSHOP," and "ADOBE INDESIGN" are trademarks of Adobe Inc. in the United States and/or other countries FIGS. 1-9, the corresponding text, and the examples provide a number of different systems, methods, and non-transitory computer readable media for learning parameters for a distilled neural network based on parameters from a source neural network utilizing multiple augmentation strategies. In addition to the foregoing, embodiments can also be described in terms of flowcharts comprising acts for accomplishing a particular result. For example, FIGS. 10-11 illustrate flowcharts of example sequences or series of acts in accordance with one or more embodiments.

Figure 10:
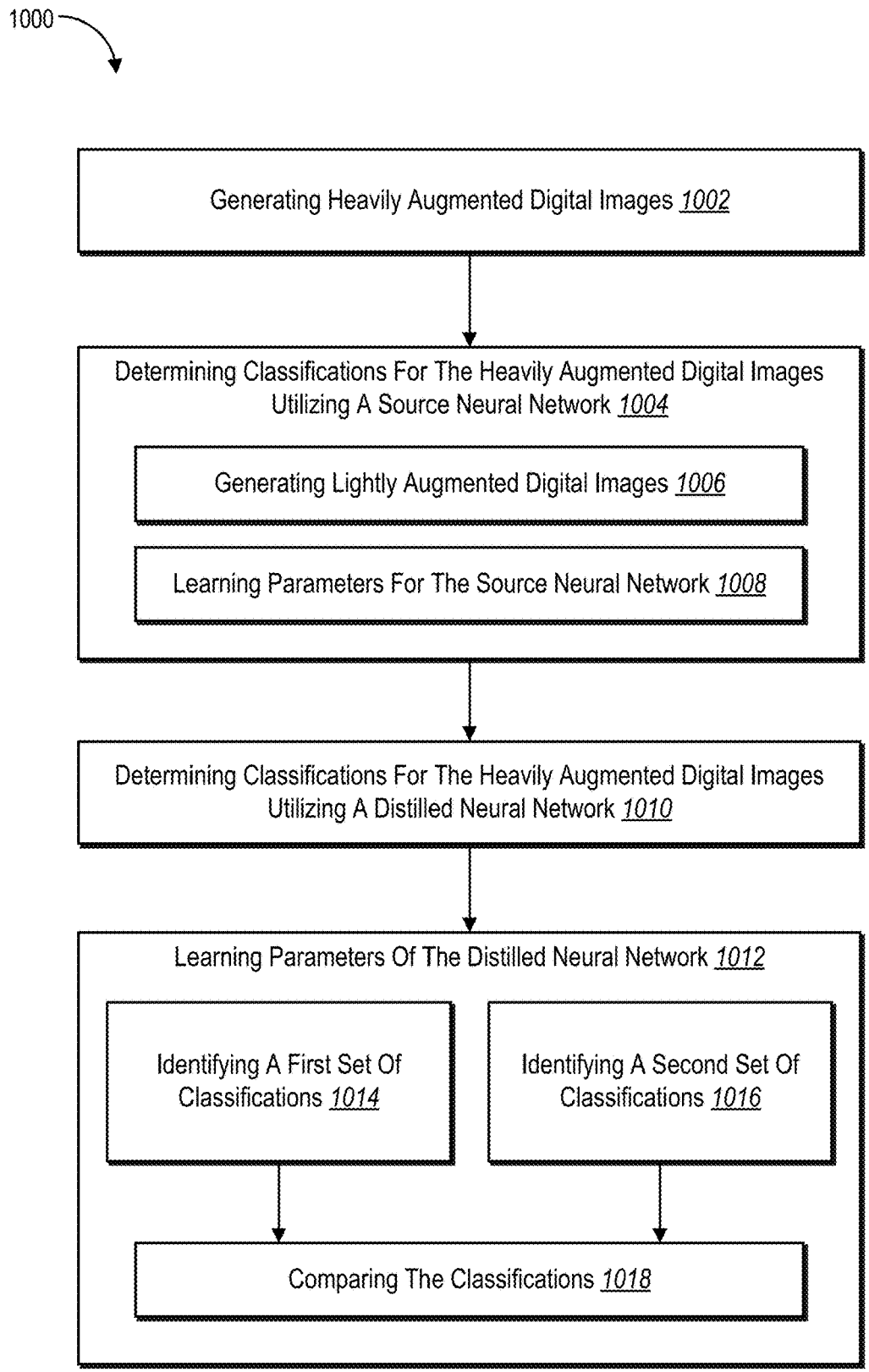
FIG. 10 illustrates a flowchart of a series of acts for learning parameters for a distilled neural network based on parameters from a source neural network utilizing multiple augmentation strategies in accordance with one or more embodiments.
Figure 11:
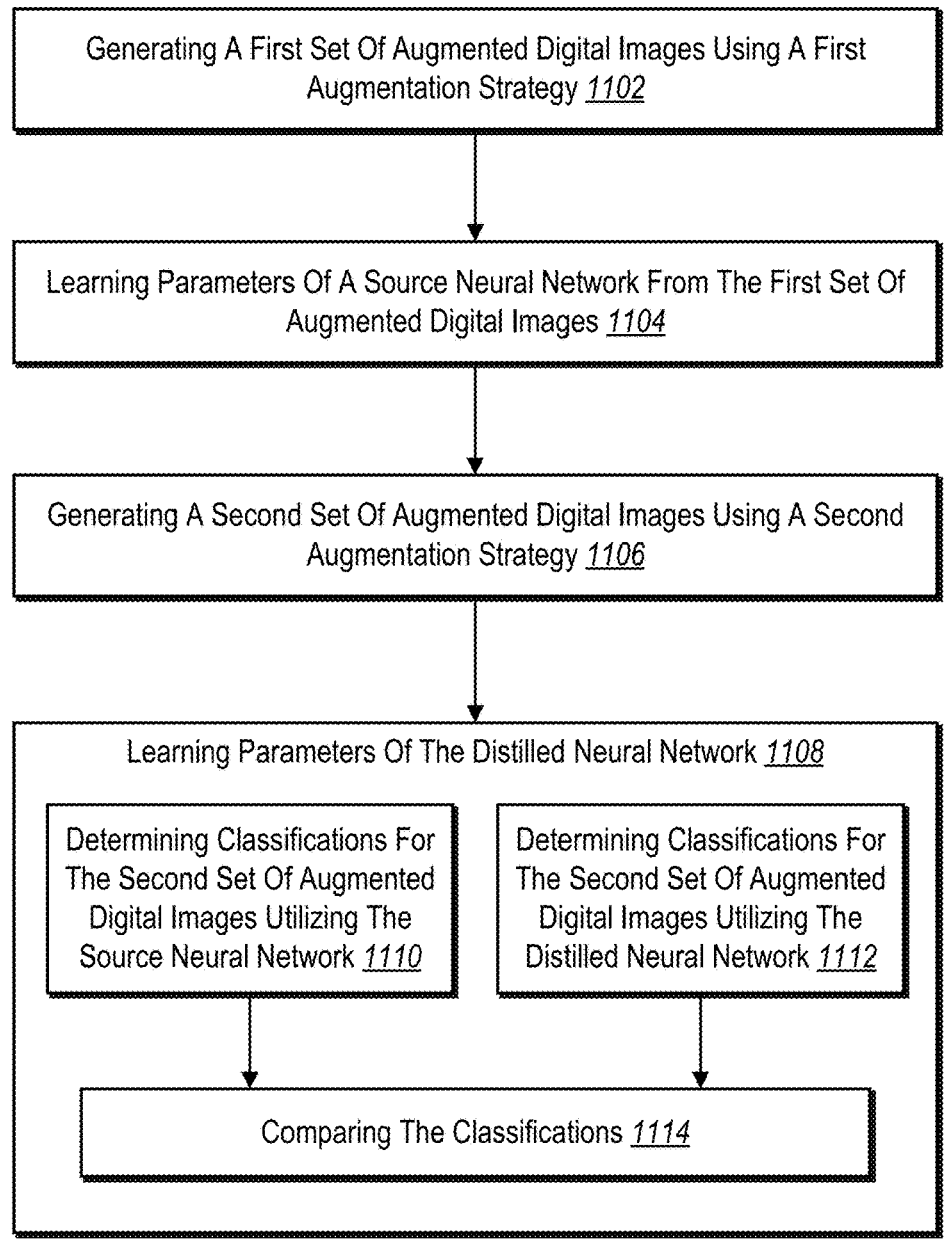
FIG. 11 illustrates another flowchart of a series of acts for learning parameters for a distilled neural network based on parameters from a source neural network utilizing multiple augmentation strategies in accordance with one or more embodiments.

While FIGS. 10-11 illustrate acts according to certain embodiments, alternative embodiments may omit, add to, reorder, and/or modify any of the acts shown in FIGS. 10-11. The acts of FIGS. 10-11 can be performed as part of a method. Alternatively, a non-transitory computer readable medium can comprise instructions, that when executed by one or more processors, cause a computing device to perform the acts of FIGS. 10-11. In still further embodiments, a system can perform the acts of FIGS. 10-11. Additionally, the acts described herein may be repeated or performed in parallel with one another or in parallel with different instances of the same or other similar acts.

FIG. 10 illustrates an example series of acts 1000 of learning parameters for a distilled neural network based on parameters from a source neural network utilizing multiple augmentation strategies. In particular, the series of acts 1000 includes an act 1002 of generating heavily augmented digital images. For example, the act 1002 involves generating heavily augmented digital images by augmenting a set of digital images using a heavy augmentation strategy that includes a heavy augmentation range with an upper limit. In some cases, the act 1002 involves augmenting the set of digital images in accordance with a second augmentation range different from a first augmentation range. In one or more embodiments, the act 1002 involves using an augmentation range that is mutually exclusive from the light augmentation range associated with the light augmentation strategy. In some cases, the act 1002 involves sampling the heavy augmentation range to select augmentation measures to apply to the set of digital images and augmenting the set of digital images by applying the selected augmentation measures.

As shown, the series of acts 1000 also includes an act 1004 of determining classifications for the heavily augmented digital images utilizing a source neural network. In some embodiments, the act 1004 includes other acts such as the act 1006 of generating lightly augmented digital images. For instance, the act 1006 involves generating the lightly augmented digital images using the light augmentation strategy by sampling the light augmentation range to select augmentation measures to apply to the set of digital images and augmenting the set of digital images by applying the selected augmentation measures. In some cases, the act 1004 includes an act 1008 of learning parameters for the source neural network. In some cases, the act 1008 involves learning parameters to transfer from the source neural network to the distilled neural network based on comparing classifications of the lightly augmented digital images with ground truth labels utilizing a classification loss function. For example, the act 1004 involves determining a first set of classifications for the heavily augmented digital images utilizing a source neural network with parameters learned from lightly augmented digital images generated from the set of digital images utilizing a light augmentation strategy that includes a light augmentation range with an additional upper limit lower than the upper limit of the heavy augmentation range.

As illustrated in FIG. 10, the series of acts 1000 includes an act 1010 of determining classifications for the heavily augmented digital images utilizing a distilled neural network. In particular, the act 1010 involve determining a second set of classifications for the heavily augmented digital images utilizing a distilled neural network.

Further, the series of acts 1000 includes an act 1012 of learning parameters of the distilled neural network. In some embodiments, the act 1012 includes additional acts such as the act 1014 of identifying a first set of classifications. Further, the act 1012 includes an act 1016 of identifying a second set of classifications. For example, the act 1012 involves learning parameters of the distilled neural network from the parameters of the source neural network based on comparing the first set of classifications and the second set of classifications.

As shown, the act 1012 further includes an act 1018 of comparing the classifications. In particular, the act 1018 involves comparing the first set of classifications and the second set of classifications. In some cases, the act 1018 involves utilizing a knowledge distillation loss function to transfer learned parameters of the source neural network to the distilled neural network. Indeed, in some embodiments, the act 1012 involves comparing the second set of classifications from the distilled neural network with ground truth labels utilizing a classification loss function.

FIG. 11 illustrates another example series of acts 1100 of learning parameters for a distilled neural network based on parameters from a source neural network utilizing multiple augmentation strategies. In particular, the series of acts 1100 includes an act 1102 of generating a first set of augmented digital images using a first augmentation strategy. For example, the act 1102 involves generating a first set of augmented digital images by augmenting a set of digital images using a first augmentation strategy that includes a first augmentation range with a first upper limit. In some cases, the act 1102 involves generating the first set of augmented digital images by sampling the first augmentation range to select a first set of augmentation measures to apply to the set of digital images. For instance, the act 1102 involves generating the lightly augmented digital images using a light augmentation strategy by rotating digital images within the set of digital images according to a first rotation range.

The series of acts 1100 also includes an act 1104 of learning parameters of a source neural network from the first set of augmented digital images. In particular, the act 1104 involves learning parameters of a source neural network based on comparing classifications of the first set of augmented digital images with ground truth labels. For example, the act 1104 involves generating a third set of classifications for the first set of augmented digital images utilizing the distilled neural network. In some cases, the act 1104 involves comparing, utilizing a classification loss function, the third set of classifications with the ground truth labels without comparing the second set of classifications with the ground truth labels. For example, the act 1104 involves comparing classifications of the lightly augmented digital images with ground truth labels utilizing a classification loss function.

In some embodiments, the series of acts 1100 includes an act of transferring learned parameters from the source neural network to the distilled neural network. In particular, the act of transferring learned parameters includes generating heavily augmented digital images by augmenting the set of digital images using a heavy augmentation strategy comprising a second augmentation range different than the first augmentation range, determining a first set of classifications utilizing the source neural network and a second set of classifications utilizing the distilled neural network from the heavily augmented digital images, and learning parameters of the distilled neural network based on comparing the first set of classifications and the second set of classifications.

Indeed, as shown, the series of acts 1100 includes an act 1106 of generating a second set of augmented digital images using a second augmentation strategy. In particular, the act 1106 involves generating a second set of augmented digital images by augmenting the set of digital images using a second augmentation strategy that includes a second augmentation range with a second upper limit greater than the first upper limit. In some cases, the act 1106 involves generating the second set of augmented digital images by sampling the second augmentation range to select a second set of augmentation measures to apply to the set of digital images. For instance, the act 1106 involves generating the heavily augmented digital images using a heavy augmentation strategy by rotating digital images within the set of digital images according to a second rotation range greater than the first rotation range. In one or more embodiments, the act 1106 involves generating the heavily augmented digital images to be mutually exclusive from the lightly augmented digital images.

Further, the series of acts 1100 includes an act 1108 of learning parameters of the distilled neural network. The act 1108 can include other acts such as the act 1110 of determining classifications for the second set of augmented digital images utilizing the source neural network. In some cases, the act 1110 involves determining the first set of classifications utilizing the source neural network to classify the heavily augmented digital images in accordance with the learned parameters of the source neural network learned from the lightly augmented digital images.

Additionally, the act 1108 can include an act 1112 of determining classifications for the second set of augmented digital images utilizing the distilled neural network. In particular, the act 1108 involves learning parameters of a distilled neural network from the learned parameters of the source neural network utilizing the second set of augmented digital images based on comparing a first set of classifications of the second set of augmented digital images generated by the source neural network with a second set of classifications of the second set of augmented digital images generated by the distilled neural network.

Further, the act 1108 can include an act 1114 of comparing the classifications. In particular, the act 1114 can include comparing the first set of classifications with the second set of classifications. For example, the act 1114 can involve comparing the classifications of the first set of augmented digital images from the source neural network with classifications of the first set of augmented digital images from the distilled neural network utilizing a knowledge distillation loss function. Indeed, the act 1114 involves comparing the first set of classifications and the second set of classifications utilizing a knowledge distillation loss function. In some cases, the act 1108 involves utilizing a classification loss function to compare the second set of classifications with the ground truth labels.

In one or more embodiments, the act 1108 involves determining a third set of classifications from the lightly augmented digital images utilizing the distilled neural network. In these or other embodiments, the act 1108 further involves learning the parameters of the distilled neural network by further comparing the third set of classifications with the first set of classifications utilizing a knowledge distillation loss function.

In some embodiments, the series of acts 1100 further includes an act of determining a classification for a digital image utilizing the distilled neural network in accordance with the learned parameters. Additionally, the series of acts 1100 includes an act of providing the digital image and an indication of the classification for display on a client device.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 12:
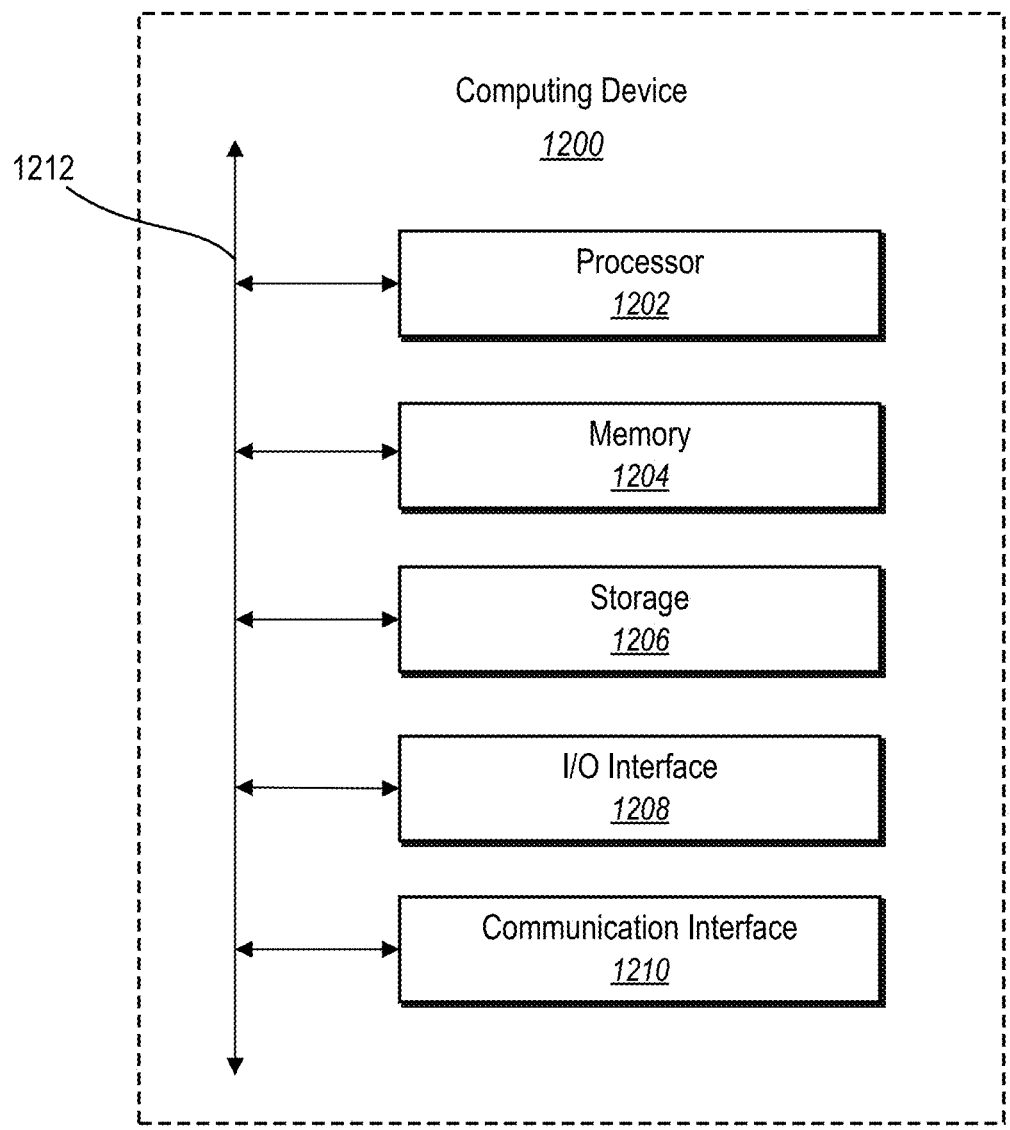
FIG. 12 illustrates a block diagram of an example computing device in accordance with one or more embodiments.

FIG. 12 illustrates, in block diagram form, an example computing device 1200 (e.g., the computing device 900, the client device 108, and/or the server(s) 104) that may be configured to perform one or more of the processes described above. One will appreciate that the knowledge distillation system 102 can comprise implementations of the computing device 1200. As shown by FIG. 12, the computing device can comprise a processor 1202, memory 1204, a storage device 1206, an I/O interface 1208, and a communication interface 1210. Furthermore, the computing device 1200 can include an input device such as a touchscreen, mouse, keyboard, etc. In certain embodiments, the computing device 1200 can include fewer or more components than those shown in FIG. 12. Components of computing device 1200 shown in FIG. 12 will now be described in additional detail.

In particular embodiments, processor(s) 1202 includes hardware for executing instructions, such as those making up a computer program. As an example, and not by way of limitation, to execute instructions, processor(s) 1202 may retrieve (or fetch) the instructions from an internal register, an internal cache, memory 1204, or a storage device 1206 and decode and execute them.

The computing device 1200 includes memory 1204, which is coupled to the processor(s) 1202. The memory 1204 may be used for storing data, metadata, and programs for execution by the processor(s). The memory 1204 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1204 may be internal or distributed memory.

The computing device 1200 includes a storage device 1206 includes storage for storing data or instructions. As an example, and not by way of limitation, storage device 1206 can comprise a non-transitory storage medium described above. The storage device 1206 may include a hard disk drive (HDD), flash memory, a Universal Serial Bus (USB) drive or a combination of these or other storage devices.

The computing device 1200 also includes one or more input or output ("I/O") devices/interfaces 1208, which are provided to allow a user to provide input to (such as user strokes), receive output from, and otherwise transfer data to and from the computing device 1200. These I/O devices/interfaces 1208 may include a mouse, keypad or a keyboard, a touch screen, camera, optical scanner, network interface, modem, other known I/O devices or a combination of such I/O devices/interfaces 1208. The touch screen may be activated with a writing device or a finger.

The I/O devices/interfaces 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1208 is configured to provide graphical data to a display for presentation to a user. The graphical data may be representative of one or more graphical user interfaces and/or any other graphical content as may serve a particular implementation.

The computing device 1200 can further include a communication interface 1210. The communication interface 1210 can include hardware, software, or both. The communication interface 1210 can provide one or more interfaces for communication (such as, for example, packet-based communication) between the computing device and one or more other computing devices 1200 or one or more networks. As an example, and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI. The computing device 1200 can further include a bus 1212. The bus 1212 can comprise hardware, software, or both that couples components of computing device 1200 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method for distilling knowledge from source neural networks to distilled neural networks, the computer-implemented method comprising:
   generating heavily augmented digital images by augmenting a set of digital images using a heavy augmentation strategy comprising a heavy augmentation range with an upper limit;
   sampling a light augmentation range to select augmentation measures to apply to the set of digital images, wherein the light augmentation range comprises an additional upper limit lower than the upper limit of the heavy augmentation range;
   generating lightly augmented digital images by augmenting the set of digital images using a light augmentation strategy to apply the augmentation measures selected from the light augmentation range;
   determining a first set of classifications for the heavily augmented digital images utilizing a source neural network with parameters learned from the lightly augmented digital images;
   determining a second set of classifications for the heavily augmented digital images utilizing a distilled neural network; and
   learning parameters of the distilled neural network from the parameters of the source neural network based on comparing the first set of classifications and the second set of classifications.

2. The computer-implemented method of claim 1, further comprising generating the lightly augmented digital images using the light augmentation strategy by randomly sampling the light augmentation range according to a normal distribution across the light augmentation range.

3. The computer-implemented method of claim 2, wherein generating the heavily augmented digital images using the heavy augmentation strategy comprises:
   sampling the heavy augmentation range to select additional augmentation measures to apply to the set of digital images; and
   augmenting the set of digital images by applying the additional augmentation measures.

4. The computer-implemented method of claim 1, further comprising learning parameters to transfer from the source neural network to the distilled neural network based on comparing classifications of the lightly augmented digital images with ground truth labels utilizing a classification loss function.

5. The computer-implemented method of claim 1, wherein comparing the first set of classifications with the second set of classifications comprises utilizing a knowledge distillation loss function to transfer learned parameters of the source neural network to the distilled neural network.

6. The computer-implemented method of claim 1, wherein generating the heavily augmented digital images utilizing the heavy augmentation strategy comprises using an augmentation range that is mutually exclusive from the light augmentation range associated with the light augmentation strategy.

7. The computer-implemented method of claim 1, wherein learning the parameters of the distilled neural network further comprises comparing the second set of classifications from the distilled neural network with ground truth labels utilizing a classification loss function.

8. A non-transitory computer readable medium comprising instructions that, when executed by at least one processor, cause a computing device to:
   sample a first augmentation range to select augmentation measures to apply to a set of digital images, wherein the first augmentation range comprises a first upper limit;
   generate a first set of augmented digital images by augmenting the set of digital images using a first augmentation strategy to apply the augmentation measures selected from the first augmentation range;
   learn parameters of a source neural network based on comparing classifications of the first set of augmented digital images with ground truth labels;
   generate a second set of augmented digital images by augmenting the set of digital images using a second augmentation strategy to apply augmentation measures selected from a second augmentation range with a second upper limit greater than the first upper limit; and
   learn parameters of a distilled neural network from the parameters learned for the source neural network utilizing the second set of augmented digital images based on comparing a first set of classifications of the second set of augmented digital images generated by the source neural network with a second set of classifications of the second set of augmented digital images generated by the distilled neural network.

9. The non-transitory computer readable medium of claim 8, further comprising instructions that, when executed by the at least one processor, cause the computing device to:
   generate the second set of augmented digital images by sampling the second augmentation range to select a second set of augmentation measures to apply to the set of digital images.

10. The non-transitory computer readable medium of claim 8, further comprising instructions that, when executed by the at least one processor, cause the computing device to:

determine a classification for a digital image utilizing the distilled neural network in accordance with the parameters learned for the source neural network; and provide the digital image and an indication of the classification for display on a client device.

11. The non-transitory computer readable medium of claim 8, further comprising instructions that, when executed by the at least one processor, cause the computing device to learn the parameters of the distilled neural network based on comparing the classifications of the first set of augmented digital images from the source neural network with classifications of the first set of augmented digital images from the distilled neural network utilizing a knowledge distillation loss function.

12. The non-transitory computer readable medium of claim 8, further comprising instructions that, when executed by the at least one processor, cause the computing device to learn the parameters of the distilled neural network by utilizing a classification loss function to compare the second set of classifications with the ground truth labels.

13. The non-transitory computer readable medium of claim 8, further comprising instructions that, when executed by the at least one processor, cause the computing device to learn the parameters of the source neural network by:

generating a third set of classifications for the first set of augmented digital images utilizing the distilled neural network; and comparing, utilizing a classification loss function, the third set of classifications with the ground truth labels without comparing the second set of classifications with the ground truth labels.

14. A system comprising:

one or more memory devices comprising a set of digital images, a source neural network, and a distilled neural network; and one or more computing devices that are configured to cause the system to:

sample a light augmentation range to select augmentation measures to apply to the set of digital images, wherein the light augmentation range comprises a first upper limit generate lightly augmented digital images by augmenting the set of digital images using a light augmentation strategy to apply the augmentation measures selected from the light augmentation range;

learn parameters for the source neural network utilizing the lightly augmented digital images; and transfer learned parameters from the source neural network to the distilled neural network by:

generating heavily augmented digital images by augmenting the set of digital images using a heavy augmentation strategy to apply augmentation measures selected from a heavy augmentation range with a second upper limit greater than the first upper limit;

determining a first set of classifications utilizing the source neural network and a second set of classifications utilizing the distilled neural network from the heavily augmented digital images; and learning parameters of the distilled neural network based on comparing the first set of classifications and the second set of classifications.

15. The system of claim 14, wherein the one or more computing devices are further configured to cause the system to learn the parameters of the source neural network based on comparing classifications of the lightly augmented digital images with ground truth labels utilizing a classification loss function.

16. The system of claim 14, wherein the one or more computing devices are further configured to cause the system to learn the parameters of the distilled neural network based on comparing the first set of classifications and the second set of classifications utilizing a knowledge distillation loss function.

17. The system of claim 14, wherein the one or more computing devices are further configured to cause the system to generate the heavily augmented digital images using the heavy augmentation range that is mutually exclusive from the light augmentation range of the lightly augmented digital images.

18. The system of claim 14, wherein the one or more computing devices are further configured to cause the system to determine the first set of classifications utilizing the source neural network to classify the heavily augmented digital images in accordance with the parameters learned for the source neural network learned from the lightly augmented digital images.

19. The system of claim 14, wherein the one or more computing devices are further configured to cause the system to:

determine a third set of classifications from the lightly augmented digital images utilizing the distilled neural network; and learn the parameters of the distilled neural network by further comparing the third set of classifications with the first set of classifications utilizing a knowledge distillation loss function.

20. The system of claim 14, wherein the one or more computing devices are further configured to cause the system to:

generate the lightly augmented digital images using the light augmentation strategy by rotating digital images within the set of digital images according to a first rotation range; and generate the heavily augmented digital images using the heavy augmentation strategy by rotating digital images within the set of digital images according to a second rotation range greater than the first rotation range.

* * * * *